United States Patent
Ishii et al.

(10) Patent No.: US 10,955,909 B2
(45) Date of Patent: Mar. 23, 2021

(54) SIMULATION SYSTEM, PROCESSING METHOD, AND INFORMATION STORAGE MEDIUM

(71) Applicant: BANDAI NAMCO ENTERTAINMENT INC., Tokyo (JP)

(72) Inventors: Yoshiaki Ishii, Sagamihara (JP); Shinya Makino, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 33 days.

(21) Appl. No.: 16/245,716

(22) Filed: Jan. 11, 2019

(65) Prior Publication Data
US 2019/0220088 A1     Jul. 18, 2019

Related U.S. Application Data

(63) Continuation of application No. PCT/JP2017/024793, filed on Jul. 6, 2017.

(30) Foreign Application Priority Data

Jul. 13, 2016   (JP) .............................. JP2016-138928

(51) Int. Cl.
*G06F 3/01* (2006.01)
*G06F 3/0484* (2013.01)
(Continued)

(52) U.S. Cl.
CPC .............. *G06F 3/012* (2013.01); *A63B 69/18* (2013.01); *A63F 13/211* (2014.09);
(Continued)

(58) Field of Classification Search
CPC ....... G06T 19/006; G06T 13/80; G06T 15/20; G06T 7/73; G06T 1/00; G06F 3/017;
(Continued)

(56) References Cited

U.S. PATENT DOCUMENTS 5,577,913 A * 11/1996 Moncrief ................ A63F 13/10
434/69
5,662,523 A *  9/1997 Yasumaru ............... A63F 13/12
463/30
(Continued)

FOREIGN PATENT DOCUMENTS

| JP | H11-309269 A | 11/1999 |
|---|---|---|
| JP | 2003-066825 A | 3/2003 |
| JP | 2015-064868 A | 4/2015 |

OTHER PUBLICATIONS

Feb. 6, 2020 Office Action issued in U.S. Appl. No. 16/245,598.
(Continued)

*Primary Examiner* — Christopher E Leiby
(74) *Attorney, Agent, or Firm* — Oliff PLC

(57) ABSTRACT

A simulation system includes a processor including hardware. The processor performs a moving body process of performing a process of moving a moving body corresponding to a user wearing an HMD in a virtual space, a virtual camera control process of controlling a virtual camera moving in accordance with a movement of the moving body, and a display process of generating an image as viewed from the virtual camera in the virtual space as a display image of the HMD. In the display process, the processor performs a display process of changing, when a change in acceleration of the moving body or a change in a line-of-sight direction of the virtual camera is determined to have satisfied a given change condition, the display image on the HMD to an image different from the image as viewed from the virtual camera.

14 Claims, 27 Drawing Sheets

(51) Int. Cl.
 A63F 13/211 (2014.01)
 A63F 13/25 (2014.01)
 A63F 13/52 (2014.01)
 A63F 13/5255 (2014.01)
 A63F 13/212 (2014.01)
 A63F 13/90 (2014.01)
 G06T 15/20 (2011.01)
 A63F 13/807 (2014.01)
 G06F 3/0481 (2013.01)
 A63F 13/57 (2014.01)
 G06T 7/73 (2017.01)
 A63B 69/18 (2006.01)
 G02B 27/01 (2006.01)
 A63B 71/06 (2006.01)

(52) U.S. Cl.
 CPC ............ *A63F 13/212* (2014.09); *A63F 13/25* (2014.09); *A63F 13/52* (2014.09); *A63F 13/5255* (2014.09); *A63F 13/57* (2014.09); *A63F 13/807* (2014.09); *A63F 13/90* (2014.09); *G02B 27/017* (2013.01); *G06F 3/0481* (2013.01); *G06F 3/0484* (2013.01); *G06T 7/73* (2017.01); *G06T 15/20* (2013.01); *A63B 2071/0644* (2013.01); *A63F 2300/8041* (2013.01); *G02B 2027/0187* (2013.01)

(58) Field of Classification Search
 CPC ...... G06F 3/0308; G06F 3/013; G06F 3/0346; G06F 3/0334; G06F 3/0484; G06F 3/012; G06F 3/0481; G06F 3/04815; G06F 3/0325; G06F 3/04847; G06F 1/163; G06F 1/1694; G06F 1/1686; G02B 27/0172; G02B 27/0093; G02B 27/017; G02B 2027/014; G02B 2027/0187; G02B 2027/0138; A63F 13/212; A63F 13/57; A63F 13/5255; A63F 13/00; A63F 13/52; A63F 13/211; A63F 13/25; A63F 13/807; A63F 13/90; A63F 2300/8041; A63B 69/18; A63B 2071/0644
 See application file for complete search history.

(56) References Cited

U.S. PATENT DOCUMENTS

| | | | | |
|---|---|---|---|---|
| 5,707,237 | A * | 1/1998 | Takemoto | A63F 13/08 434/69 |
| 5,921,780 | A * | 7/1999 | Myers | G09B 9/05 434/29 |
| 6,010,403 | A * | 1/2000 | Adam | A63F 13/08 463/6 |
| 6,417,856 | B1 * | 7/2002 | Tamura | A63F 13/10 345/474 |
| 6,632,138 | B1 * | 10/2003 | Serizawa | A63F 13/005 463/6 |
| 6,752,716 | B1 * | 6/2004 | Nishimura | A63F 13/08 463/6 |
| 7,126,607 | B2 * | 10/2006 | Emerson | A63F 13/10 345/474 |
| 7,328,900 | B2 * | 2/2008 | Mamitsu | A63F 13/08 273/148 B |
| 7,625,287 | B2 * | 12/2009 | Champagne | A63F 13/2145 463/38 |
| 7,736,220 | B2 * | 6/2010 | Mori | A63F 13/10 463/6 |
| 8,412,499 | B2 * | 4/2013 | Sizov | G06F 30/15 703/8 |
| 9,179,619 | B1 * | 11/2015 | Hood | A01H 5/10 |
| 9,418,568 | B2 * | 8/2016 | Welles | G09B 9/05 |
| 9,589,384 | B1 * | 3/2017 | Waggoner | G06T 15/20 |
| 2007/0082742 | A1 * | 4/2007 | Takizawa | A63F 13/525 463/43 |
| 2010/0004097 | A1 * | 1/2010 | D'Eredita | A63B 71/0622 482/8 |
| 2011/0164044 | A1 * | 7/2011 | Huang | A63B 71/0622 345/473 |
| 2012/0094754 | A1 * | 4/2012 | Suzuki | A63F 13/655 463/30 |
| 2016/0005263 | A1 * | 1/2016 | Keilwert | G07F 17/3206 463/33 |
| 2016/0225192 | A1 * | 8/2016 | Jones | G06F 3/012 |
| 2017/0076496 | A1 | 3/2017 | Inomata et al. | |
| 2017/0160793 | A1 * | 6/2017 | Perlin | G06F 3/011 |
| 2017/0228928 | A1 * | 8/2017 | Terahata | G06F 3/013 |
| 2017/0228931 | A1 * | 8/2017 | Parker | G02B 27/017 |
| 2017/0358140 | A1 | 12/2017 | Kohler et al. | |
| 2018/0193737 | A1 * | 7/2018 | Gohara | A63F 13/25 |
| 2019/0220087 | A1 * | 7/2019 | Ishii | A63F 13/212 |
| 2019/0220089 | A1 * | 7/2019 | Kakizawa | A63F 13/212 |

OTHER PUBLICATIONS

Aug. 29, 2017 International Search Report issued in International Patent Application No. PCT/JP2017/024793.

U.S. Appl. No. 16/245,598, filed Jan. 11, 2019 in the name of Yoshiaki Ishii et al.

* cited by examiner

FIG. 17A

| EVENT | PROCESS START TIMING |
|---|---|
| EV1 | TM1 |
| EV2 | TM2 |
| EV3 | TM3 |
| ⋮ | ⋮ |

FIG. 17B

| EVENT | PROCESS LEVEL |
|---|---|
| EV1 | PD1 |
| EV2 | PD2 |
| EV3 | PD3 |
| ⋮ | ⋮ |

SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2017/024793, having an international filing date of Jul. 6, 2017, which designated the United States, the entirety of which is incorporated herein by reference. Japanese Patent Application No. 2016-138928 filed on Jul. 13, 2016 is also incorporated herein by reference in its entirety.

BACKGROUND

The disclosure relates to a simulation system, a processing method, an information storage medium, and the like.

Simulation systems using head mounted displays (HMDs) have conventionally been known. The system enables a user wearing the HMD on his or her head to experience a virtual reality (VR) world by watching an image displayed on a screen of the HMD. Japanese Patent Application Publication No. 1999-309269 discloses an example of a conventional technique of such a simulation system.

In the simulation system using an HMD, an image as viewed from a virtual camera in a virtual space is displayed on the HMD. With such an image displayed on the HMD, a vast VR space spreads over the entire field of view of a user, whereby virtual reality felt by the user can be largely improved.

In such a simulation system, a moving body such as a character corresponding to the user moves in a virtual space, and an image as viewed from a virtual camera following the movement of the moving body is generated. Under this condition, when a traveling direction and/or an orientation of the moving body largely changes, the position and/or the orientation of the virtual cameral changes, resulting in a large change in the display image on the HMD. The large change in the display image leads to a load on the user's eyes, which may result in a problem such as the user feeling 3D sickness.

BRIEF DESCRIPTION OF THE DRAWINGS

FIG. 17A and FIG. 17B are diagrams illustrating a method of setting a process start timing and a process level in accordance with each event.

DESCRIPTION OF EXEMPLARY EMBODIMENTS

Figure 1:
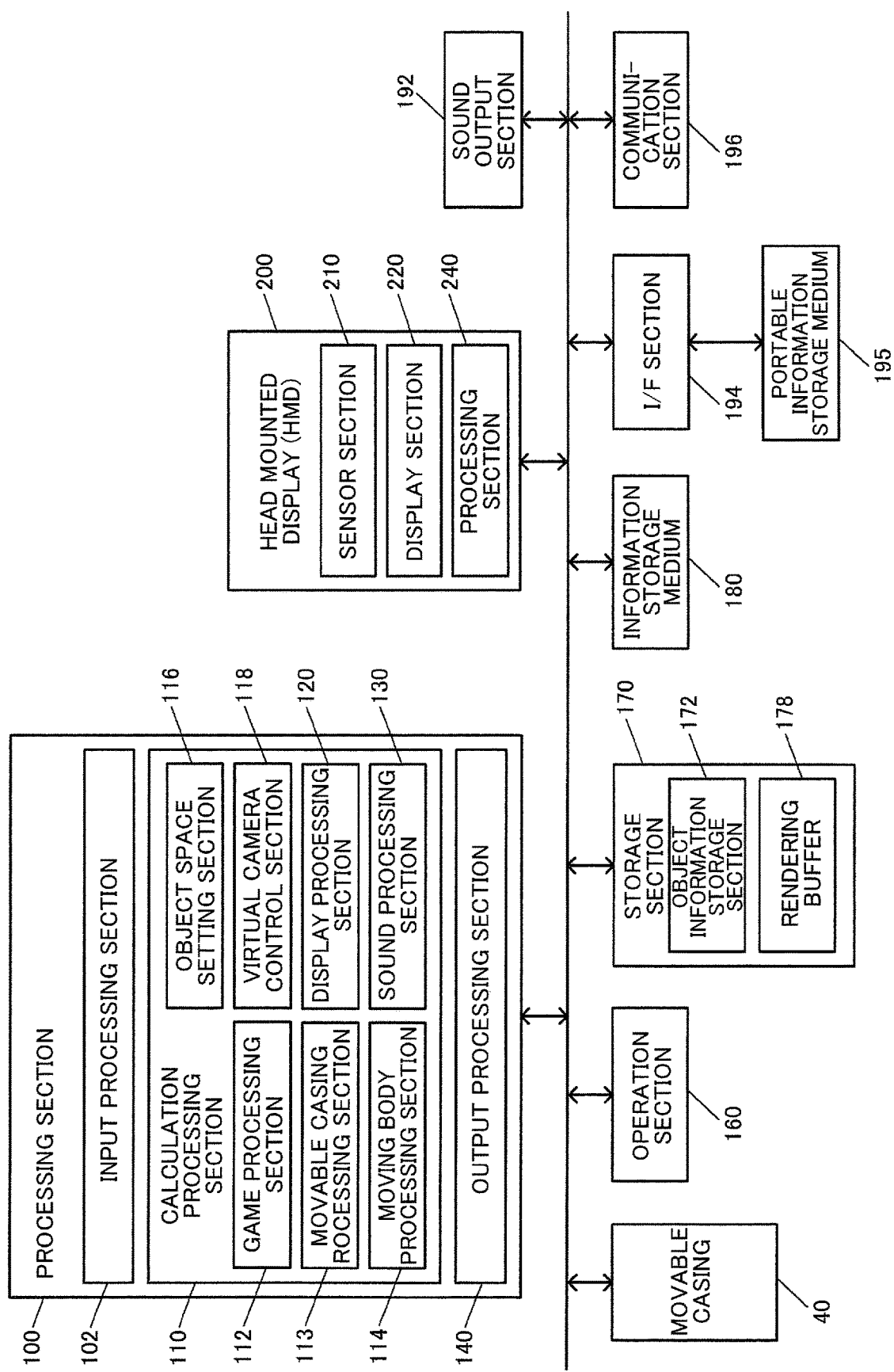
FIG. 1 is a block diagram illustrating a configuration example of a simulation system according to the present embodiment.

The following disclosure provides various different embodiments and examples to embody different features of the presented subject matters. These are apparently provided for illustrative purposes only and are not intended to be construed in a limiting sense. The present disclosure may include repeated use of reference numerals and/or characters in various examples. Such repetitions are provided for a concise and clear description, and do not simply require any relation with various embodiments and/or configurations described. Furthermore, a description of a first element "connected" or "coupled" to a second element includes some embodiments in which the first element is directly connected or coupled to the second element and other embodiments in which the first element is indirectly connected or coupled to the second element with one or more other elements interposed therebetween.

In accordance with one of some embodiments, a simulation system, a processing method, an information storage medium, and the like can be provided that are capable of reducing a load and the like on a user due to a change in acceleration of the moving body or a change in a line-of-sight direction of the virtual camera.

In accordance with one of some embodiments, there is provided a simulation system comprising a processor including hardware, the processor being configured to perform:

a moving body process of performing a process of moving a moving body corresponding to a user wearing a head mounted display in a virtual space;

a virtual camera control process of controlling a virtual camera moving in accordance with a movement of the moving body; and a display process of generating an image as viewed from the virtual camera in the virtual space as a display image on the head mounted display, in the display process, the processor may perform a display process of changing, when a change in acceleration of the moving body or a change in a line-of-sight direction of the virtual camera is determined to have satisfied a given change condition, the display image on the head mounted display to an image different from the image as viewed from the virtual camera.

In accordance with one of some embodiments, a process of moving a moving body corresponding to a user in a virtual space is performed, and an image as viewed from the virtual camera moving in accordance with a movement of the moving body is generated as a display image on the head mounted display. When a change in the acceleration of the moving body or a change in the line-of-sight direction of the virtual camera satisfies the given change condition, the display image on the head mounted display changes to an image different from the image as viewed from the virtual camera. For example, the image as viewed from the virtual camera maintained to be displayed as the display image on the head mounted display despite a change in the acceleration of the moving body or the line-of-sight direction of the virtual camera satisfying the given change condition may impose a load on the user's eyes. In accordance with one of some embodiments, when such a situation may occur, the display image on the head mounted display changes from a normal image as viewed from the virtual camera to an image different from such an image. Thus, a simulation system and the like that can reduce a load on the user and the like due to a change in the acceleration of the moving body or a change in the line-of-sight direction of the virtual camera can be provided.

In accordance with one of some embodiments, in the display process, the processor may perform a display process of entirely changing the display image on the head mounted display when the given change condition is satisfied.

With this configuration, the display image on the head mounted display can be entirely changed to avoid a situation where the image as viewed from the virtual camera may impose a load on the user's eyes with the given change condition satisfied.

In accordance with one of some embodiments, in the display process, the processor may perform a process of fading out the display image, as the display process of entirely changing the display image.

With this configuration, the display image on the head mounted display fades out to avoid a situation where the image as viewed from the virtual camera may impose a load on the user's eyes with the given change condition satisfied.

In accordance with one of some embodiments, in the display process, the processor may perform a display process of performing a given effect process on the image as viewed from the virtual camera when the given change condition is satisfied.

With this configuration, the effect process can be performed on the image as viewed from the virtual camera to reduce a load on the user's eyes and the like, when the given change condition is satisfied.

In accordance with one of some embodiments, in the display process, the processor may performs a display process of changing, when the given change condition is determined to have been satisfied with an acceleration change event that changes a traveling direction of the moving body to a direction different from the traveling direction occurring, the display image on the head mounted display to the image different from the image as viewed from the virtual camera.

With this configuration, when the acceleration change event that changes the traveling direction of the moving body to a direction different from the traveling direction occurs, the display image on the head mounted display changes to an image different from the image as viewed from the virtual camera, so that a load on the user's eyes and the like can be reduced.

In accordance with one of some embodiments, the acceleration change event may be at least one of a collision event of the moving body and a falling off event of the moving body.

With this configuration, when an event where the moving body collides with a possible collision object or falls occurs, the display image on the head mounted display changes to an image different from the image as viewed from the virtual camera so that a load on the user's eyes and the like at the time of the collision or the fall can be reduced.

In accordance with one of some embodiments, the processor may perform a display process of changing the display image on the head mounted display to an image different from the image as viewed from the virtual camera with the given change condition determined to have been satisfied when an angular change of the line-of-sight direction of the virtual camera is equal to or larger than a given angle.

With this configuration, when the line-of-sight direction of the virtual camera largely changes by the given angle or more, the display image on the head mounted display changes to an image different from the image as viewed from the virtual camera, so that a load on the user's eyes and the like due to the large change in the line-of-sight direction can be reduced.

In accordance with one of some embodiments, in the display process, the processor may perform setting at least one of a process start timing and a process level of the display process of changing to the image different from the image as viewed from the virtual camera to be different between a case where a first event satisfying the given change condition occurs and a case where a second event satisfying the given change condition occurs.

With this configuration, the display process of changing to an image different from the image as viewed from the virtual camera can be performed at an appropriate process start timing or the process level corresponding to each event.

In accordance with one of some embodiments, in the virtual camera control, the processor may perform controlling the virtual camera set as a first person point-of-view of the user.

With this configuration, in a virtual reality system in which the head mounted display displays a first person point-of-view image, a load and the like imposed on the user due to a change in the acceleration of the moving body or a change in the line-of-sight direction of the virtual camera can be reduced.

In accordance with one of some embodiments, the processor may perform an input process of acquiring tracking information for point-of-view information about the user wearing the head mounted display, and in the virtual camera control process, the processor may perform setting the virtual camera so that a position and/or an orientation of the virtual camera is changed based on the tracking information, but orientation change of the virtual camera corresponding to at least one of pitching and rolling is disabled or limited in a case where a traveling direction of the moving body changes.

With the position and/or the orientation of the virtual camera thus changed based on the tracking information for the point-of-view information about the user, a display image with enhanced virtual reality can be displayed on the head mounted display. On the other hand, the orientation change of the virtual camera corresponding to pitching and/or rolling is disabled or limited in a case where the traveling direction of the moving body changes so that a risk of the problem due to the display image being shaken and the like such as 3D sickness can be reduced.

In accordance with one of some embodiments, the simulation system may further comprise a movable casing that changes a play position of the user in accordance with a change in a status of a course on which the moving body moves or a change in a traveling direction of the moving body.

With this configuration where the play position of the user is changed by the movable casing, the user can feel a change in the traveling direction of the moving body or the status of the course, whereby a risk of 3D sickness and the like can further be reduced.

In accordance with one of some embodiments, the processor may perform a sound process of generating a sound corresponding to a status of a course on which the moving body moves or an output sound corresponding to a change in a traveling direction of the moving body.

With this configuration, the user can aurally recognize a change in the traveling direction of the moving body or the status of the course with a change in the output sound, whereby a risk of 3D sickness and the like can further be reduced.

In accordance with one of some embodiments, in the display process, the processor may perform changing at least one of a process start timing and a process level of the display process of changing to an image different from the image as viewed from the virtual camera based on setting information from the user or play history information about the user.

With this configuration, the process start timing or the process level can be set for the display process of changing to the image different from the image as viewed from the virtual camera, based on the setting information input by the user or the past history information about the user.

In accordance with one of some embodiments, there is provided a processing method comprising:

performing a moving body process of performing a process of moving a moving body corresponding to a user wearing a head mounted display in a virtual space;

performing a virtual camera control process of controlling a virtual camera moving in accordance with a movement of the moving body; and performing a display process of generating an image as viewed from the virtual camera in the virtual space as a display image of the head mounted display, in the display process, performing changing, when a change in acceleration of the moving body or a change in a line-of-sight direction of the virtual camera is determined to have satisfied a given change condition, the display image on the head mounted display to an image different from the image as viewed from the virtual camera.

An exemplary embodiment of the disclosure is described below. Note that the following exemplary embodiments do not in any way limit the scope of the disclosure defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system) according to the present embodiment. The simulation system according to the present embodiment is a system that simulates Virtual Reality (VR) for example, and can be applied to various systems such as a game system providing game contents, a real-time simulation system including a sports event simulator and a driving simulator, a content providing system that provides a content such as a movie, or an operating system for implementing a remote controlled operation. The simulation system according to the present embodiment is not limited to the configuration illustrated in FIG. 1, and can be modified in various ways including omitting some of its components (sections) or adding another component.

A movable casing 40 is a casing that changes a play position of a user and the like. For example, the movable casing 40 changes the play position of the user in accordance with a change in a traveling direction of a moving body or a status of a course on which the moving body moves. The movable casing 40 will be described in detail later.

Figure 6:
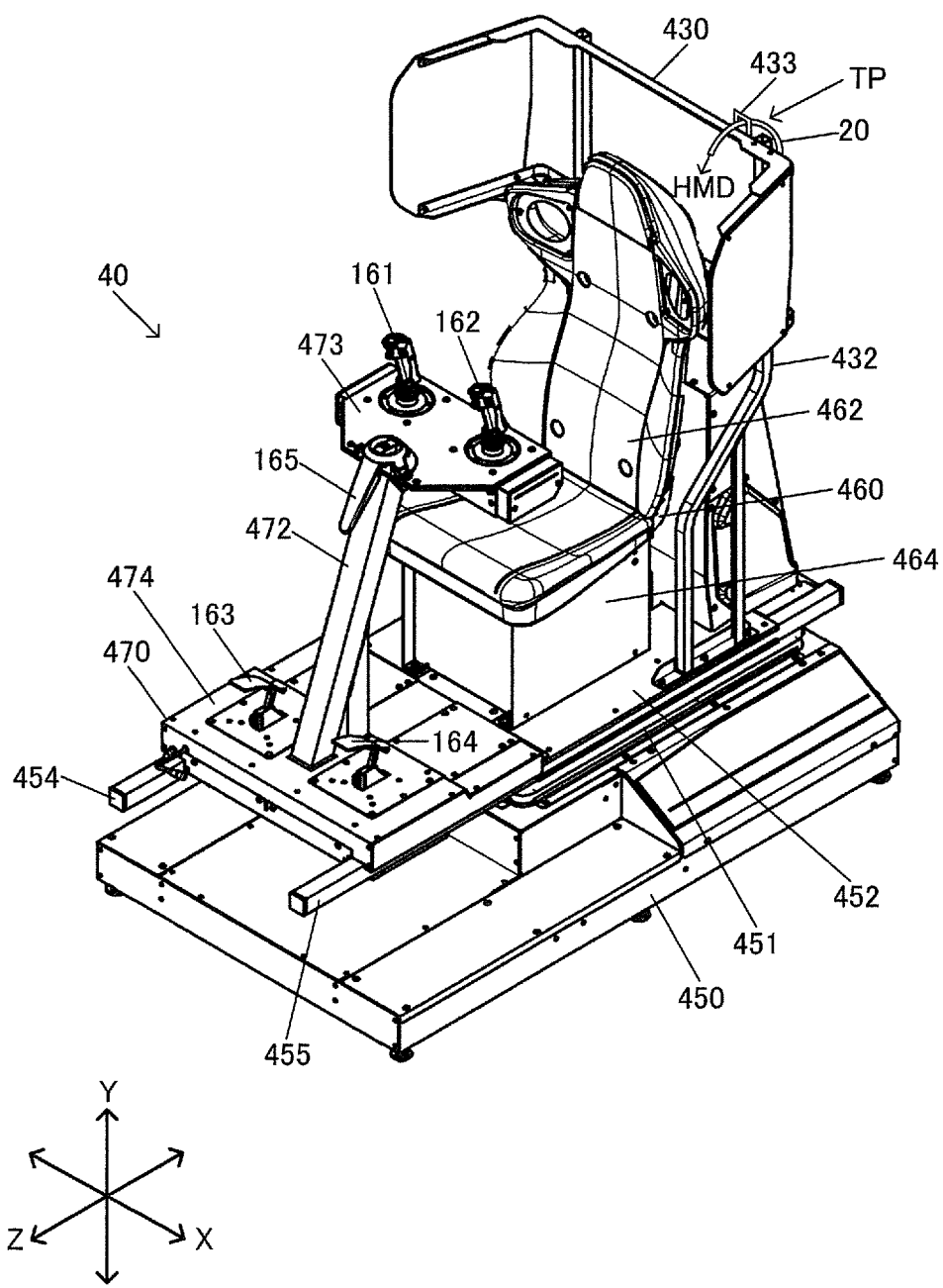
FIG. 6 illustrates a configuration example of a robot simulator that is an example of the simulation system.

An operation section 160 is used by a user (player) to input various types of operation information (input information). The operation section 160 can be implemented by various operation devices such as an operation button, a direction designating key, a joystick, a handle, a pedal, and a lever for example. For example, in FIG. 4 described later, the operation section 160 is implemented with operation members 43 and 44, foot pedals 45 and 46, and the like. In FIG. 6, the operation section 160 is implemented with operation levers 161 and 162, an accelerator pedal 163, and a brake pedal 164.

A storage section 170 stores therein various types of information. The storage section 170 functions as a work area for a processing section 100, a communication section 196, and the like. The storage section 170 stores therein a game program and game data required for executing the game program. The function of the storage section 170 can be implemented by a semiconductor memory (dynamic random access memory (DRAM), video RAM (VRAM)), a hard disk drive (HDD), a solid state drive (SSD), an optical disc device, or the like. The storage section 170 includes an object information storage section 172 and a rendering buffer 178.

An information storage medium 180 (computer readable medium) stores therein a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. A modification where the HMD 200 is provided with a light emitting element may be employed. The sensor section 210 implements a tracking process such as head tracking for example. For example, the position and the direction of the HMD 200 are identified through the tracking process performed with the sensor section 210. With the position and the direction of the HMD 200 thus identified, a point-of-view position and a line-of-sight direction of the user can be identified.

Various tracking schemes can be employed. For a first tracking scheme as an example of the tracking scheme, a plurality of light receiving elements (such as photodiodes) are provided as the sensor section 210, as will be described in detail later with reference to FIG. 2A and FIG. 2B. With the plurality of light receiving elements receiving light (such as a laser beam) from a light emitting element (such as a light emitting diode (LED)) provided outside, a position and a direction of the HMD 200 (the head of the user) in a three-dimensional space of the real world are identified. For a second tracking scheme, the HMD 200 is provided with a plurality of light emitting elements (LEDs) as will be described in detail later with reference to FIG. 3A and FIG. 3B. The position and the direction of the HMD 200 are identified with an external image capturing section capturing an image with light from the plurality of light emitting elements. A third tracking scheme uses a motion sensor, provided to the sensor section 210, to identify the position and the direction of the HMD 200. For example, the motion sensor can be implemented with an acceleration sensor, a gyro sensor, or the like. For example, the position and the direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, or a combination of the first tracking scheme and the third tracking scheme. A tracking process of directly identifying the point-of-view position and line-of-sight direction of the user, instead of identifying the position and the direction of the HMD 200 to identify the point-of-view position and line-of-sight direction of the user, may be employed.

For example, the display section 220 of the HMD 200 can be implemented with a liquid crystal display (LCD), an organic electroluminescence (EL) display, or the like. For example, the display section 220 of the HMD 200 is provided as a first display set to be in front of the left eye of the user, and a second display set to be in front of the right eye of the user, whereby stereoscopic view can be implemented for example. The stereoscopic view is implemented with left-eye and right-eye images, with parallax, generated to be respectively displayed on the first and the second displays. Alternatively, the left-eye image and the right-eye image may be respectively displayed on the first and the second display areas of a single display.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a moving body process, a virtual camera control process, a display process, or sound process based on operation information from the operation section 160, tracking information about the HMD 200 (information about at least one of the position and direction of the HMD, information about at least one of the point-of-view position and the line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes a game processing section 112, a movable casing processing section 113, a moving body processing section 114, an object space setting section 116, a virtual camera control section 118, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the sensor section 210 of the HMD 200; a process of reading information, designated with a read command, from the storage section 170; and a process of receiving information from an external apparatus (such as a server) through a network. The receiving process includes a process of instructing the communication section 196 to receive information, acquiring the information received by the communication section 196, and writing the information to the storage section 170.

For example, the calculation processing section 110 performs various calculation processes For example, the calculation processes are performed for a game process (simulation process), a moving body process, a virtual camera control process, a display process, a sound process, or the like.

The game processing section 112 (a program module for a game process) performs various game processes for the user to play the game. In other words, the game processing section 112 (simulation processing section) performs various simulation processes to enable the user to experience virtual reality. Examples of the game process include a process of starting the game when a game start condition is satisfied, a process of making the started game progress, a process of ending the game when a game end condition is satisfied, and a process of calculating a game result.

The movable casing processing section 113 (a program module for a movable casing process) performs various processes for the movable casing 40 including, for example, a control process for the movable casing 40 and a detection process for various types of information for controlling the movable casing 40. For example, the movable casing processing section 113 performs a control process for air spring sections 50 to 53 illustrated in FIG. 4 described later. For example, a control process for extending/contracting the air spring sections 50 to 53 is performed. When a swing operation is performed with the operation members 43 and 44, or an edging operation is performed with the foot pedals 45 and 46, the movable casing processing section 113 performs a detection process for the resultant operation information, and performs the control process for the movable casing 40 and the like based on the operation information thus detected. The movable casing processing section 113 performs a control process for an electric cylinder (not illustrated) that changes the orientation (by pitching, rolling, and the like) of a base section 452 illustrated in FIG. 6. For example, a process of controlling a linear motion of a rod section of the electric cylinder is performed. The movable casing processing section 113 performs a detection process for operation information about the operation levers 161 and 162, the accelerator pedal 163, and the brake pedal 164 in FIG. 6, and performs a control process for the movable casing 40 and the like based on the operation information detected.

The moving body processing section 114 (a program module for a moving body process) performs various processes for a moving body that moves in a virtual space. For example, a process of moving the moving body in an object space (game space) that is a virtual space or a process of causing the moving body to make an action is performed. For example, the moving body processing section 114 performs a control process based on the operation information input by the user using the operation section 160, tracking information acquired, a program (movement/operation algorithm), and various types of data (motion data), and the like. The control process includes moving the moving body (model object) in the object space (virtual space) and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, ¹⁄₆₀ seconds) by frame basis. The frame is a unit of time for performing a movement/action process (simulation process) of the moving body and an image generation process.

For example, the moving body is a virtual user (virtual player) in a virtual space corresponding to the user (player) in the real space or a ridden moving body (operated moving body) ridden (operated) by the virtual user. For example, the moving body is a character (virtual user) that skies in the virtual space and corresponds to the user in a case of a ski simulator in FIG. 4 described later, or is a robot (ridden moving body) that is ridden by a character (virtual user) corresponding to the user in a case of a robot simulator in FIG. 6.

The object space setting section 116 (a program module for an object space setting process) performs a setting process for an object space (a virtual space in a broad sense) in which a plurality of objects are arranged. For example, a process of setting an arrangement of various objects (an object formed by a primitive surface such as a polygon, a free-form surface or a subdivision surface) representing various display objects such as a moving body (such as a person, a robot, a car, a train, an aircraft, a boat, a monster, or an animal), a map (terrain), a building, audience seats, a course (road), woods, a wall, and a water surface in the object space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a moving speed, a moving direction, and the like of an object (part object) in the virtual space. The object space setting section 116 performs a process of updating this object information on a frame by frame basis for example.

The virtual camera control section 118 (a program module for a virtual camera control process) performs a control process for a virtual camera (point-of-view, reference virtual camera) to generate an image as viewed from a given (any) point-of-view in the object space. For example, a process of controlling a position (point-of-view position) or an orientation (line-of-sight direction) of the virtual camera is performed. Specifically, a process (a process of controlling a point-of-view position, a line-of-sight direction, or an angle of view) of controlling the position (X, Y, Z) of the virtual camera and a rotational angle (a rotational angle about an X, Y, or Z axis) as orientation information is performed. The virtual camera corresponds to a point-of-view of the user (virtual user). When stereoscopic view is implemented, a left-eye first point-of-view (left-eye first virtual camera) and a right-eye second point-of-view (right-eye second virtual camera) are set.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220 of the HMD 200. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image in the object space (virtual space) as viewed from the virtual camera (a given point-of-view, a left-eye, right-eye, first, or second point-of-view) is generated. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the moving body processing section 114, the virtual camera control section 118, and the display processing section 120, as illustrated in FIG. 1. Furthermore, the input processing section 102 may be included.

The moving body processing section 114 performs a process of moving the moving body (such as a virtual user or a ridden moving body) corresponding to the user in the virtual space (object space). For example, the moving body processing section 114 performs a process of moving the moving body on a course and the like in the virtual space, by performing a process of obtaining information about the position and the direction of the moving body once in every predetermined period of time (in each frame for example). Furthermore, the moving body processing section 114 performs a process (motion process) of causing the moving body to make an action and the like.

The virtual camera control section 118 controls a virtual camera moving in accordance with the movement of the moving body. For example, the virtual camera that moves to follow the moving body is controlled. For example, the virtual camera control section 118 controls the virtual camera set as a first person point-of-view of the user. For example, the virtual camera is set to be at a position corresponding to the point-of-view of a moving body moving in the virtual space, and the point-of-view position and the line-of-sight direction of the virtual camera are set to control the position (position coordinates) and the orientation (a rotational angle about a rotation axis) of the virtual camera.

The display processing section 120 generates an image as viewed from the virtual camera (user point-of-view) in the virtual space as a display image (display video) of the HMD 200. For example, an image as viewed from a given pointof-view in the object space as the virtual space is generated. The image generated is preferably a stereoscopic image.

The display processing section 120 performs a display process of changing, when a change in acceleration of the moving body or a change in the line-of-sight direction of the virtual camera is determined to have satisfied a given change condition, a display image on the HMD 200 to an image different from an image as viewed from the virtual camera. For example, the display processing section 120 changes the display image on the HMD 200 to an image different from an image displayed as a normal game image (simulation image), when the given change condition is determined to have been satisfied. For example, the display image is changed to an image different from a game image (simulation image) that is updated in real-time, based on a result of a game process (simulation process). For example, the display image on the HMD 200 is changed to an image reducing a load on the user's eyes (such as 3D sickness) due to the change in the acceleration of the moving body and/or the change in the line-of-sight direction of the virtual camera. For example, whether or not the given change condition has been satisfied may be determined by actually monitoring the change in the acceleration of the moving body or the change in the line-of-sight direction of the virtual camera, or determined based on whether or not an event (such as an acceleration change event or a line-of-sight direction change event) satisfying the given change condition has occurred.

For example, the display processing section 120 performs a display process of entirely changing the display image on the HMD 200 when the given change condition is satisfied. Thus, a display process of entirely changing the display image is performed. For example, the display processing section 120 performs the display process with all the pixels in the display image as targets. Specifically, a display process is performed to change pixel values of all the pixels in the display image to a given value (for example, a pixel value corresponding to a predetermined color such as white or black). Alternatively, an effect process (filter process) with all the pixels in the display image as targets is performed.

For example, the display processing section 120 performs a process of fading out the display image as the display process of entirely changing the display image. For example, a process is performed so that the display image fades out when a given period of time elapses after an occurrence of an event satisfying a given condition. For example, the fadeout process is a process in which the color of the pixels (all the pixels) of the display image gradually changes to a predetermined color. Examples of the fadeout process include a whiteout process and a blackout process. The whiteout process is a process of gradually whitening the color (luminous value) of the pixels of the display image. The blackout process is a process of gradually blackening the color of the pixels of the display image. The fadeout process is not limited to the whiteout process or the blackout process, and various processes such as a redout process of gradually reddening the color of all the pixels in the display image can be contemplated for example.

The display processing section 120 may perform a display process of performing a given effect process on an image as viewed from the virtual camera when the given change condition is satisfied. For example, when an event satisfying the give condition occurs, the given effect process is performed on the image as viewed from the virtual camera, after a given period of time, for example. Thus, the display image on the HMD 200 can be changed to an image different from the image as viewed from the virtual camera, when the given change condition is satisfied. Examples of various process that can be contemplated as the effect process in such a case include a blurring process, a semitransparent combining process, a binarization process, or a mosaic process. For example, the effect process may be implemented by performing various image filter processes on the image as viewed from the virtual camera. Examples of various processes that can be contemplated as the image filter process include a moving average filter process, a Gaussian filter process, or a median filter process. For example, the display processing section 120 performs the image filter process and the like on the image generated in real-time by a game process (simulation process), to implement the effect process in a case where the given change condition is satisfied. This effect process is preferably performed entirely on the display image on the HMD 200, but may also be performed partially on the image.

The display processing section 120 determines that the given change condition is satisfied, when an acceleration change event that changes a traveling direction of the moving body to a direction different from the traveling direction occurs. Then, the display process is performed to change the display image on the HMD 200 to an image different from the image as viewed from the virtual camera. For example, the given change condition is determined to have been satisfied, when an acceleration change event occurs where an acceleration (virtual acceleration in the virtual space) that changes the traveling direction of the moving body leftward, rightward, downward, or upward is determined to have applied. For example, the given change condition is determined to have been satisfied when an occurrence condition for a such an acceleration change event is satisfied. For example, first to N-th acceleration change events are prepared. When an m-th ($1 \leq m \leq N$) acceleration change event in the first to the N-th acceleration change events is determined to have occurred, a display process associated with the m-th acceleration change event is performed as the display process of changing to an image different from the image as viewed from the virtual camera is performed. Specifically, the display process is performed at a process start timing and/or a process level corresponding to the m-th acceleration change event.

For example, the acceleration change event is at least one of a collision event and a falling off event of the moving body. The acceleration change event may be an event other than the collision event or the falling off event. For example, the acceleration change event may be a sudden deceleration event, a sudden acceleration event, or a steep slope traveling event.

For example, the collision event is an event in which the moving body collides with another object in the virtual space. Such a collision with the other object is assumed to lead to acceleration (caused by reaction due to collision) that changes the traveling direction of the moving body, and thus the given change condition is determined to have been satisfied for acceleration change. Then, the display process of changing the display image on the HMD 200 to an image different from the image as viewed from the virtual camera is performed.

For example, the falling off event is an event in which the moving body makes a falling off movement toward the downward direction or the like. For example, the falling off event is an event in which the moving body falls off in the downward direction, with a course (map) no longer existing beneath the moving body. Such a falling off movement of the moving body thus falling is assumed to lead to acceleration (acceleration due to gravity) changing the traveling direction of the moving body toward the downward direction, and thus the given change condition is determined to have been satisfied for acceleration change. Then, the display process of changing the display image on the HMD 200 to an image different from the image as viewed from the virtual camera is performed. Here, for example, the display process performed when the collision event occurs and the display process performed when the falling off event occurs may be different from each other in process content. For example, at least one of the process start timing and the process level is set to be different between the display processes.

When an angular change of the line-of-sight direction of the virtual camera is equal to or larger than a given angle, the display processing section 120 determines that the given change condition is satisfied, and performs the display process of changing the display image on the HMD 200 to an image different from the image as viewed from the virtual camera. For example, when the angular change of the line-of-sight direction of the virtual camera reaches or exceeds the given angle due to the moving body falling down, rotating, or moving out of control, the given change condition is determined to have been satisfied. For example, when an event in which the angular change of the line-of-sight direction of the virtual camera reaches or exceeds the given angle due to the moving body as in the collision event or the falling off event described above occurs, the given change condition is determined to have been satisfied, and the process of changing to an image different from the image as viewed from the virtual camera is performed.

The display processing section 120 sets at least one of the process start timing and the process level of the display process of changing to an image different from the image as viewed from the virtual camera to be different between a case where a first event satisfying the given change condition occurs and a case where a second event satisfying the given change condition occurs. For example, the process start timing of the display process is set to be earlier for the first event than for the second event. Alternatively, the process level of the display process is set to be higher for the first event than for the second event. The process start timing is a timing at which the process such as the fadeout process, the effect process, or the like starts. For example, the process level is a fadeout time (a time required for the original image to change to a predetermined color) in the fadeout process or the level of the effect (filter strength) in the effect process, and is set as a process parameter for the fadeout process or the effect process. For example, the first event is the collision event described above, and the second event is the falling off event for example. However, this should not be construed in a limiting sense, and various events may be contemplated as the first and the second events.

The simulation system according to the present embodiment includes the input processing section 102. The input processing section 102 (input reception section) acquires tracking information for point-of-view information about the user wearing the HMD 200 (head mounted display). For example, the input processing section 102 acquires tracking information (point-of-view tracking information) for point-of-view information that is at least one of the point-of-view position and the line-of-sight direction of the user. For example, the tracking information can be acquired by performing a tracking process for the HMD 200. The point-of-view position and the line-of-sight direction of the user may be directly acquired by the tracking process.

The virtual camera control section 118 controls the virtual camera set as a first person point-of-view of the user. For example, the virtual camera control section 118 changes the position and the orientation of the virtual camera based on the tracking information (information about at least one of the point-of-view position and the line-of-sight direction of the user). For example, the virtual camera control section 118 sets the virtual camera so that the position (point-of-view position) and the orientation (line-of-sight direction) of the virtual camera changes in accordance with the change in the point-of-view position and the line-of-sight direction of the user in the real space.

For example, the virtual camera is set for the point-of-view (first person point-of-view) of the virtual user in the virtual space. When the point-of-view position and the line-of-sight direction of the user changes as a result of the user in the real space (real world) wearing the HMD 200 shaking his or her head or moving his or her body, the point-of-view position and the line-of-sight direction of the virtual user in the virtual space change accordingly. Thus, when the point-of-view position and the line-of-sight direction of the user in the real space change, the position and the orientation of the virtual camera in the virtual space change accordingly. When the virtual user (character) or its ridden moving body (such as a robot, a train, a car, a motor cycle, a bicycle, an aircraft, or a ship) moves in the virtual space by the user operating the operation section 160, the position (the point-of-view position of the virtual user) of the virtual camera also changes to follow the movement. Thus, the user can experience virtual reality as if the virtual user as his or her avatar, or its ridden moving body is moving in the virtual space. The point-of-view of the virtual user in the virtual space is the first person point-of-view. An image as viewed from the first person point-of-view may include a body part of the virtual user (character) and what is going on inside the ridden moving body.

The virtual camera control section 118 further sets the virtual camera to disable or limit orientation change of the virtual camera corresponding to at least one of pitching and rolling in a case where the traveling direction of the moving body changes. For example, the orientation of the virtual camera is set so that the pitching and/or rolling does not occur in accordance with a change in the traveling direction of the moving body. For example, when the point-of-view position and/or the line-of-sight direction of the user in the real space changes, the position and/or the orientation of the virtual camera changes accordingly. However, the virtual camera is set not to perform pitching and/or rolling in accordance with the traveling direction of the moving body in a case where the traveling direction of the moving body changes. For example, the virtual camera is set so that a pitch angle and/or a roll angle does not change and thus is maintained at an initially set angle. For example, the virtual camera is set so that pitching (pitch angle) is in parallel with a plane (XZ plane) in a horizontal direction in the world coordinate system in the virtual space for example. The virtual camera is set so that the rolling (roll angle) does not change from the vertical direction (Y axis) of the world coordinate system for example. The disabling of the orientation change corresponding to the pitching and/or rolling means that the orientation change corresponding to the pitching and/or rolling will not be performed. The limiting of the orientation change corresponding to the pitching and/or rolling means that the orientation change corresponding to the pitching and/or rolling will be performed but with a rotational angle (sufficiently small rotational angle) smaller than the rotational angle of the pitching and/or rolling corresponding to the traveling direction of the moving body.

The orientation of the virtual camera can be defined by a vector of the line-of-sight direction of the virtual camera and a vector of an upward direction of the virtual camera (a vector indicating which direction is the upward direction of the virtual camera). The vector of the line-of-sight direction can be set based on a gaze position of the virtual camera. For example, orientation change (rotational movement) corresponding to pitching and/or yawing of the virtual camera can be implemented by changing the vector of the line-of-sight direction of the virtual camera. For example, the orientation change (rotational movement) corresponding to rolling of the virtual camera can be implemented by changing the vector of the upward direction of the virtual camera.

The input processing section 102 acquires tracking information obtained by the tracking process for the HMD 200. For example, tracking information for identifying the point-of-view information that is at least one of the point-of-view position and the line-of-sight direction of the user is acquired through the tracking process for the HMD 200 as illustrated in FIG. 2A to FIG. 3B described later. The tracking information includes change information indicating a change of the point-of-view information from initial point-of-view information of the user. For example, the tracking information includes at least one of: change information (a value indicating a change in coordinates of the point-of-view position) indicating a change of the point-of-view position from the initial point-of-view position of the user; and change information (a value indicating a change in the rotational angle of the line-of-sight direction about the rotation axis) indicating a change of the line-of-sight direction from the initial line-of-sight direction of the user. Based on the change information about the point-of-view information included in such tracking information, the point-of-view position and/or the line-of-sight direction of the user can be identified.

The moving body processing section 114 performs a process of moving a moving body while disabling or limiting orientation change of the moving body corresponding at least one of pitching and rolling in a case where the traveling direction of the moving body changes. For example, when the traveling direction of the moving body moving on a course or the like is changed, a model object of the moving body is set to be arranged at a position as the destination of the movement, without causing the orientation change of the moving body corresponding to the pitching and/or rolling. Then, the virtual camera control section 118 sets the virtual camera to be at the position of the point-of-view of the moving body for which the orientation change is disabled or limited. For example, the virtual camera is set to be arranged at the position of the first person point-of-view of the moving body corresponding to the virtual user. This configuration disables or limits the orientation change of the virtual camera corresponding to at least one of the pitching and rolling in a case where the traveling direction of the moving body changes.

Specifically, in this case, a process of moving a reference position of the local coordinate system for the moving body in the world coordinate system is performed for example. The reference position of the local coordinate system is the origin position for example, and the moving body is set to be arranged to have a predetermined position (for example, a foot position, a waist position, or the like described later) arranged at the origin position of the local coordinate system. The local coordinate system is set to disable or limit rotational movement corresponding to at least one of the pitching and rolling of the local coordinate system relative to the world coordinate system. The point-of-view coordinate system (the origin of the point-of-view coordinate system) for the virtual camera is set to be at the point-of-view position of the moving body in the local coordinate system.

The method of controlling the orientation of the virtual camera in the method of moving the moving body while disabling or limiting the orientation change of the moving body corresponding to pitching and/or rolling in a case where the traveling direction of the moving body changes, is not limited to the method described above. The image may be projected by a projection device on a projection screen, instead of being displayed on the HMD 200. The projection screen is a screen including a single curved surface or a plurality of surfaces, and is a curved screen that is known as a dome shaped screen for example.

The orientation of the moving body can be defined by a rotational angle of the moving body (model object) about each of a plurality of rotation axes (X axis, Y axis, and Z axis). The orientation change of the moving body corresponds to rotational movement about each rotation axis. For example, the orientation of the moving body can be defined by the rotational angle of the moving body about each rotation axis of the local coordinate system with respect to the world coordinate system, and can be represented by a rotation matrix for the coordinate conversion for example.

The moving body processing section 114 performs a process of moving the moving body on a course while disabling or limiting orientation change of the moving body corresponding to at least one of the pitching and rolling in a case where the traveling direction of the moving body changes due to a change in a status of the course in the virtual space. On the other hand, an orientation of a given object accompanying the moving body is changed in accordance with the shape of the course.

For example, course information corresponding to the course is stored in the storage section 170, and the moving body processing section 114 performs the process of moving the moving body based on the course information. For example, course information, such as height information and direction information about the course, is stored in association with each point on the course, and the moving body processing section 114 reads the course information about a point corresponding to the position of the moving body, to perform a process of moving the moving body in the traveling direction. For example, the traveling direction of the moving body is set so that the moving body moves in a downward direction in a downhill course, and moves in an upward direction in an uphill course. The traveling direction of the moving body is set so that the moving body moves in a rightward direction in a right curve course, and moves in a leftward direction in a left curve course. The process of moving the moving body is performed so that the orientation change of the moving body corresponding to the pitching and/or rolling is disabled (or limited) in a case where the traveling direction of the moving body thus changes. Even in such a case, the orientation is changed in accordance with the status (such as the shape) of the course, a for a given object (such as a ski board, a body part of a character as the moving body, and the like) accompanied by the moving body. For example, the orientation of the given object is changed to be along a downhill on a downhill course, and is changed to be along an uphill on an uphill course.

The moving body processing section 114 performs a process of moving the moving body so that the orientation of the moving body changes in accordance with a change in the traveling direction of the moving body. For example, the moving body is moved with the orientation changed to show the movement in the downward direction when the traveling direction is the downward direction, and is moved with orientation changed to show the movement in the upward direction when the traveling direction is the upward direction. Similarly, the moving body is moved with the orientation changed to show the movement of turning right and the movement of turning left respectively in cases where the traveling direction is turned right or left. Also in this case, the virtual camera control section 118 sets the virtual camera to disable or limit the orientation change of the virtual camera corresponding to at least one of the pitching and rolling in a case where the orientation of the moving body changes in accordance with a change in the traveling direction of the moving body. For example, orientation change of the virtual camera corresponding to pitching is disabled or limited also when the orientation of the moving body changes to the orientation corresponding to the downward direction or the upward direction as the traveling direction advancing in the downward direction or the upward direction. For example, the orientation change of the virtual camera corresponding to the pitching is disabled. For example, orientation change of the virtual camera corresponding to rolling is disabled or limited also when the orientation of the moving body changes to turn right or left with the traveling direction curving in the rightward direction or the leftward direction. For example, the orientation change of the virtual camera corresponding to the rolling is disabled.

In the present embodiment, a virtual reality simulation process is performed as a game process for the game played by the user. The virtual reality simulation process is a simulation process simulating a real space event in the virtual space, and is for enabling the user to virtually experience the event. For example, a process of moving the moving body such as a virtual user corresponding to the user in the real space or its ridden moving body in the virtual space is performed for enabling the user to experience a change in an environment or surroundings due to the movement.

The movable casing 40 changes the play position based on a result of the simulation process that is the game process. For example, the play position is changed based on a result of the process of moving the moving body in the virtual space or the like. For example, the movable casing 40 performs a process of changing the play position as a simulation process for enabling the user to feel the change (accelerated or decelerated) in acceleration due to the change in the traveling direction of the user. Alternatively, when the moving body moves on the course, the movable casing 40 performs a process of changing the play position as a simulation process for enabling the user to feel the ups and downs or bumpiness of the course. With the play position thus changed by the movable casing 40, movement of the display image on the HMD 200 is somewhat linked with the change in acceleration and the like felt by the user, whereby the 3D sickness and the like felt by the user can be suppressed.

The play position is a position of the user playing a virtual reality (VR) simulation game. For example, the play position is a ride position of the user on a ride section such as a seat. For example, when a virtual reality simulation game is played with the player seated on a seat serving as the ride section, the play position is a seated position which corresponds to the ride position for the seat for example. When the user is saddled on a ride section simulating a ride such as a motor cycle or a bicycle or an animal such as horse, the play position is the saddled position. In a simulation game played by the user in a standing posture, the play position is the standing position of the user for example.

The simulation system according to the present embodiment includes the sound processing section 130. The sound processing section 130 performs a process of generating sound corresponding to a change in the traveling direction of the moving body or generating output sound corresponding to the status of the course on which the moving body moves. For example, when the traveling direction of the moving body changes or the status of the course changes, the output sound for making a user recognize the change is generated. For example, for a bumpy course, a "rattling" sound is output so that the user can aurally recognize that the course is bumpy. When the traveling direction of the user suddenly changes, sound that makes the user recognize the change (accelerated or decelerated) in the acceleration involved in the change in the traveling direction is output, so that the user can aurally recognize the change in the traveling direction. Thus, a risk of making the user feel 3D sickness can be reduced.

The display processing section 120 changes at least one of the process start timing and the process level of the display process of changing to an image different from the image as viewed from the virtual camera based on the setting information from the user or the play history information about the user. For example, the process start timing and the process level of the display process is enabled to be set on an option setting screen for the user to input various types of setting information for the game. Alternatively, the process start timing and the process level of the display process are changed based on the past play history information about the user. For example, the process start timing of the display process is set to be late or the process level is set to be low for the user that is determined to have played the game frequently and thus is determined to be familiar with the gameplay or a skilled player, based on the play history information. On the other hand, the process start timing of the display process is set to be early or the process level is set to be high for a user who is determined not to be familiar with the gameplay and a user determined to be an elementary level player, based on the play history information. For example, based on the play history information, the process of changing to an image different from the image as viewed from the virtual camera is performed while taking into account the number of times the user has made collision, falling off, or falling down, or a past setting. The play history information may be read from the portable information storage medium 195 held by the user, or may be downloaded from a server based on identification information such as a user ID stored in the portable information storage medium 195.

2. Tracking Process

Figure 2A:
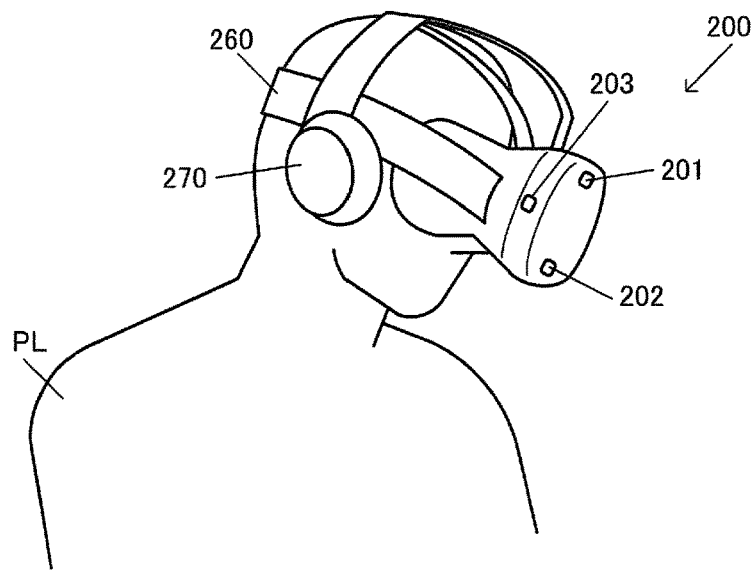
FIG. 2A and FIG. 2B illustrate an example of an HMD used in the present embodiment.

Next, an example of a tracking process will be described. FIG. 2A illustrates an example of the HMD 200 used in the simulation system in the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD.

The HMD 200 is provided with a headband 260 and the like so that a user PL can stably wear the HMD 200 on his or her head with a better fitting comfort. The HMD 200 is provided with an unillustrated headphone terminal. The user PL can hear game sound as a result of a three-dimensional acoustic (three-dimensional audio) process for example, with a headphone 270 (sound output section 192) connected to the headphone terminal. The user may be enabled to input operation information through a head nodding or shaking action to be detected by the sensor section 210 of the HMD 200 and the like.

Figure 2B:
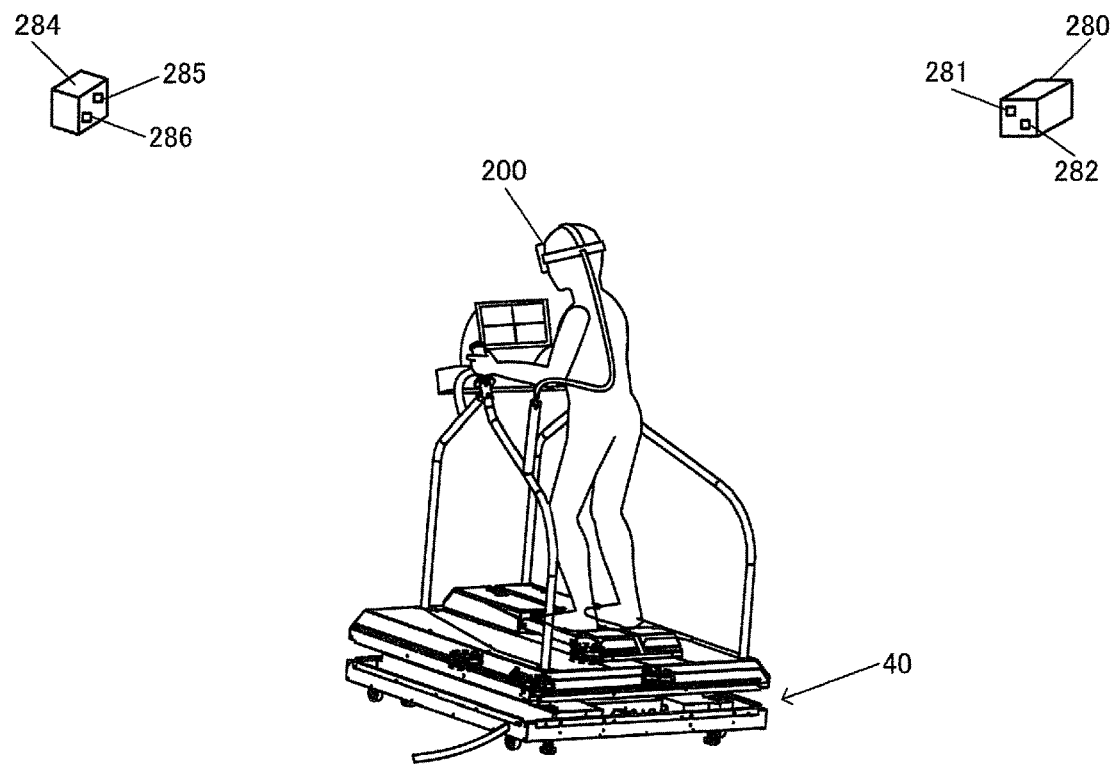

As illustrated in FIG. 2B, base stations 280 and 284 are installed in the periphery of the simulation system (movable casing 40). The base station 280 is provided with light emitting elements 281 and 282, and the base station 284 is provided with light emitting elements 285 and 286. For example, the light emitting elements 281, 282, 285, and 286 are implemented with LEDs that emit laser beams (such as infrared laser beams). The base stations 280 and 284 radially emit laser beams by using the light emitting elements 281, 282, 285, and 286, for example. With the light receiving elements 201 to 203 provided to the HMD 200 in FIG. 2A and the like receiving the laser beams from the base stations 280 and 284, the tracking of the HMD 200 is implemented so that the position and the facing direction of the head of the user PL (point-of-view position, line-of-sight direction) can be detected.

Figure 3A:
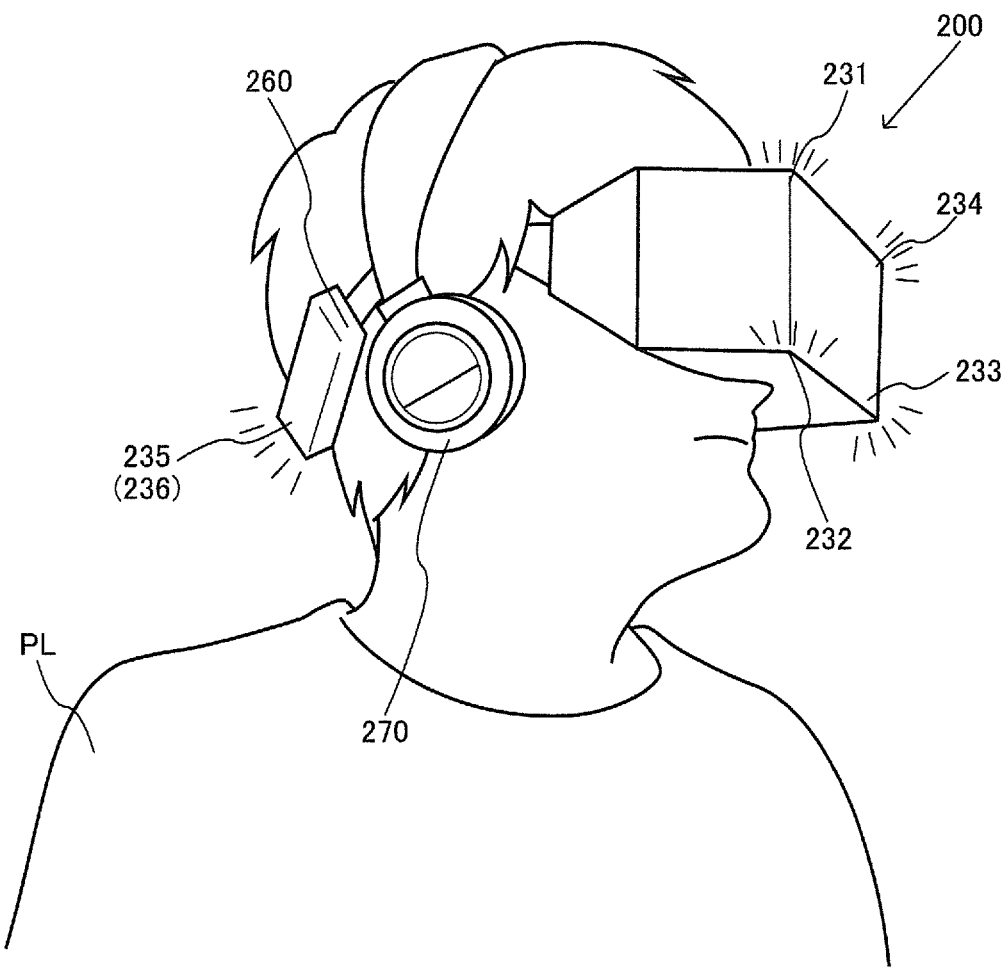
FIG. 3A and FIG. 3B illustrate another example of the HMD used in the present embodiment.
Figure 3B:
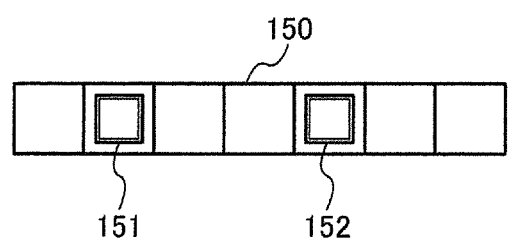

FIG. 3A illustrates another example of the HMD 200. The HMD 200 illustrated in FIG. 3A is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. An image capturing section 150 illustrated in FIG. 3B is provided on the forward side of the user PL, and captures an image of the light from the light emitting elements 231 to 236. Thus, the captured image obtained by the image capturing section 150 includes spots of the light from the light emitting elements 231 to 236. The head (HMD) of the user PL is tracked with image processing executed on the captured image. Thus, the three-dimensional position and the facing direction of the head of the user PL (the point-of-view position and the line-of-sight direction) are detected.

For example, as illustrated in FIG. 3B, the image capturing section 150 is provided with first and second cameras 151 and 152. The position of the head of the user PL in a depth direction and the like can be detected by using first and second captured images respectively captured by the first and the second cameras 151 and 152. Based on motion detection information obtained by the motion sensor provided to the HMD 200, the rotational angle (line-of-sight) of the head of the user PL can also be detected. Thus, with such an HMD 200, the display section 220 of the HMD 200 can display an image (an image as viewed from the virtual camera corresponding to the point-of-view of the user) of the virtual space (virtual three-dimensional space) corresponding to the direction in which the user PL is facing regardless of which of all 360 degrees directions he or she is facing. LEDs emitting infrared light, instead of the visible light, may be used as the light emitting elements 231 to 236. Furthermore, another method such as one using a depth camera or the like may be employed to detect the position and/or movement of the head of the user and the like.

The tracking process for detecting the point-of-view position and/or line-of-sight direction (the position and/or direction of the user) of the user is not limited to the method described with reference to FIG. 2A to FIG. 3B. For example, the tracking process may be implemented solely by the HMD 200 by using the motion sensor and the like provided to the HMD 200. Specifically, the tracking process is implemented without providing external devices such as the base stations 280 and 284 in FIG. 2B, the image capturing section 150 in FIG. 3B, and the like. Alternatively, various point-of-view tracking processes such as known eye tracking, face tracking, or head tracking can be employed to detect the point-of-view information such as the point-of-view position and the line-of-sight direction or the like of the user.

3. Specific Example of Simulation System

Figure 4:
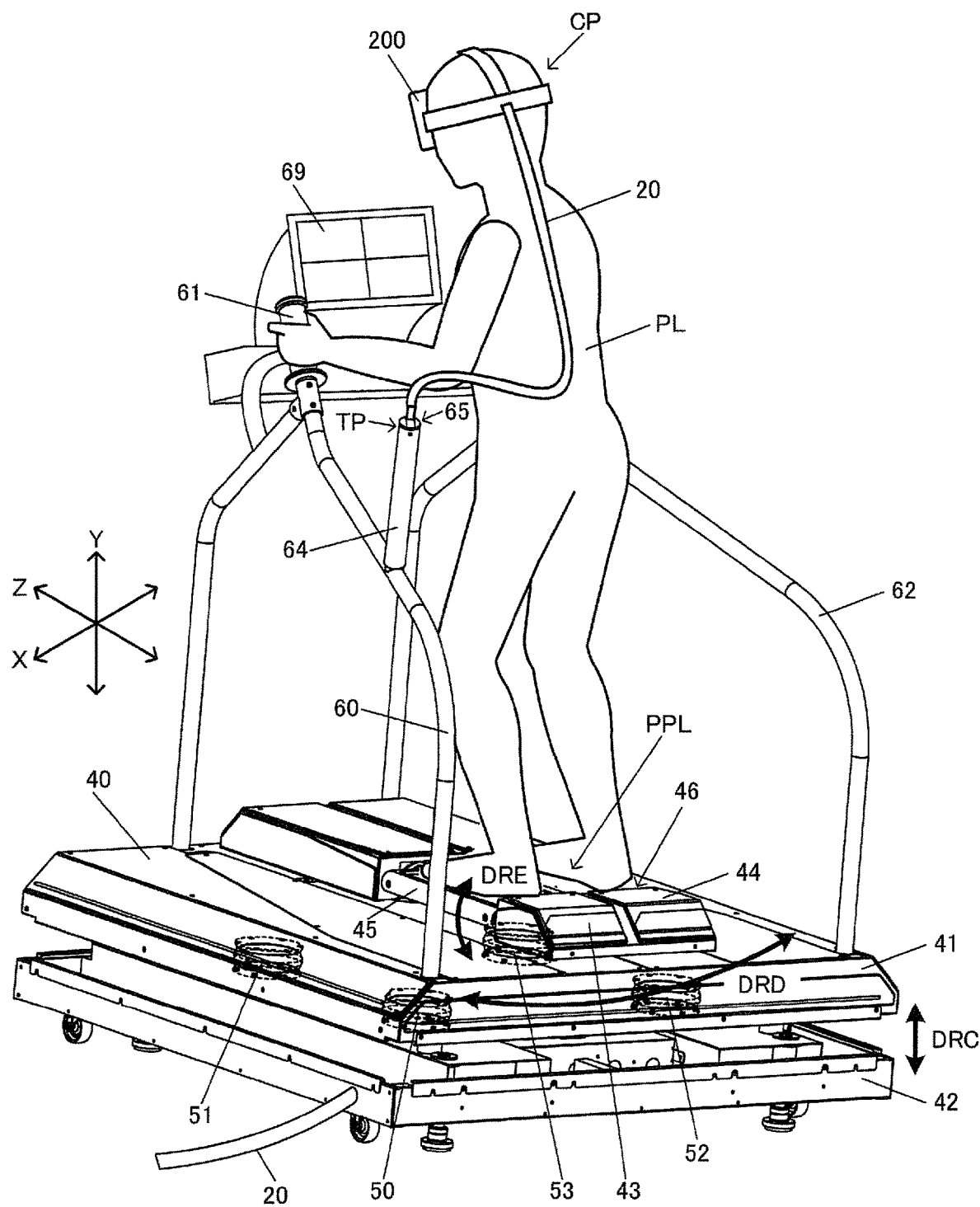
FIG. 4 illustrates a configuration example of a ski simulator that is an example of the simulation system.

Next, a specific example of the simulation system will be described. FIG. 4 is a perspective view illustrating a configuration example of a ski simulator that is an example of the simulation system.

The ski simulator illustrated in FIG. 4 includes the movable casing 40 that includes base sections 41 and 42 facing each other. The base sections 41 and 42 are provided to face each other in a DRC direction in FIG. 4. A space between the base sections 41 and 42 has the air spring sections 50, 51, 52, and 53 (extension/contraction sections in a broad sense) at its four corners. The air spring sections 50, 51, 52, and 53 extend/contract in the DRC direction with air supplied or discharged using an air compressor and bubbles.

For example, as illustrated in FIG. 4, the vertical direction corresponds to a Y axis direction, the facing direction of the user PL corresponds to a Z axis direction, and a direction orthogonal to the Y axis direction and the Z axis direction corresponds to an X axis direction. Under this condition, the base section 41 can be moved toward the upper side in the Y axis direction (upper side relative to the base section 42) with all of the air spring sections 50, 51, 52, and 53 extended. The base section 41 can be moved toward the downward side in the Y axis direction with all of the air spring sections 50, 51, 52, and 53 contracted. With these movements of the base section 41 in upward and downward direction, a condition of a snow surface on which the user skies and the like can be simulated. For example, bumps on the snow surface can be simulated with the base section 41 quickly moving upward and downward with small strokes.

Of the air spring sections 50, 51, 52, and 53 at the four corners, the left air spring sections 50 and 51 may contract while the right air spring sections 52 and 53 extend, or the left air spring sections 50 and 51 may extend while the right air spring sections 52 and 53 contract so that rolling of the base section 41 about the Z axis can be implemented. The rear air spring sections 50 and 52 may contract while the front air spring sections 51 and 53 extend, or the rear air spring sections 50 and 52 may extend while the front air spring sections 51 and 53 contract so that pitching of the base section 41 about the X axis can be implemented. The status of a slope skied by the user can be expressed through such rolling and/or pitching.

The movable casing 40 includes the operation members 43 and 44. The operation members 43 and 44 are provided on the base section 41. The operation member 43 is provided with the rotatably mounted foot pedal 45 stepped on by the left foot of the user PL. The operation member 44 is provided with the rotatably mounted foot pedal 46 stepped on by the right foot of the user PL.

Specifically, the operation members 43 and 44 makes a swing movement (swinging) in a DRD direction in FIG. 4. This swing movement enables yawing about the Y axis. The foot pedals 45 and 46 pivot in a DRE direction. Thus, rotation about the Z axis can be implemented.

The user PL performs an operation using the operation members 43 and 44 and the foot pedals 45 and 46 with a skiing maneuver. For example, a ski operation simulating skiing in the real world is performed with a swing operation of causing the operation members 43 and 44 to make a swing movement in the DRD direction, and an edging operation of causing the foot pedals 45 and 46 to pivot in the DRE direction. As a result, the virtual user displayed on the HMD 200 performs a corresponding ski operation so that the user PL can experience virtual reality of skiing on a course in the virtual space.

The movable casing 40 is further provided with guide sections 60 and 62. The user PL plays a ski simulation game while standing on a play position PPL defined by the guide sections 60 and 62. The guide sections 60 and 62 are provided with holding sections 61 and 63 (the holding section 63 is not illustrated) held by the hands of the user PL. The holding sections 61 and 63 correspond to grips of skipoles in the real world. The user PL supports his or her body by gripping such holding sections 61 and 63 of the guide sections 60 and 62, representing the skipoles, with his or her hands. Then, the player enjoys the ski simulation game by making a skiing maneuver with the swing operation using the operation members 43 and 44, and an edging operation using the foot pedals 45 and 46, while holding the left and right holding sections 61 and 63 to support his or her body. Wind blows from a wind tunnel 69 provided in front of the user PL so that virtual reality providing a realistic feeling of the wind against his or her body while skiing can be implemented.

The guide section 60 also guides a cable 20, from a processing device (a device including the processing section 100 and the storage section 170 in FIG. 1. for example, a game device or a personal computer (PC)) for generating the display image on the HMD 200, from the lower side to the upper side along a predetermined route. For example, the guide section 60 is formed of a pipe with a hollow structure, and the cable 20 from the processing device passes through the pipe of the guide section 60 to be drawn out from a cable drawing port 65. Specifically, the guide section 60 includes a support guide 64 that has a rod shape and supports the cable 20 at the cable drawing port 65 as a via point TP, and the cable 20 is drawn out from the cable drawing port 65 as the via point TP to be connected to the HMD 200.

In FIG. 4, the air spring sections 50 to 53 extend and contract so that the movement of the base section 41 in the upward and downward directions as well as the rotational movement of the base section 41 including the rolling about the Z axis and the pitching about the X axis are implemented, and the play position PPL of the user PL changes accordingly. Specifically, the play position PPL that is a standing position of the user PL changes in accordance with the upward and downward movement and/or the rotational movement including rolling and pitching of the base section 41, on which the user PL stands. As described above, the movable casing 40 changes the play position PPL of the user PL in accordance with a change in the traveling direction of the moving body, such as a virtual user or a ridden moving body, in the virtual space or in accordance with the status of the course on which the moving body moves.

Figure 5:
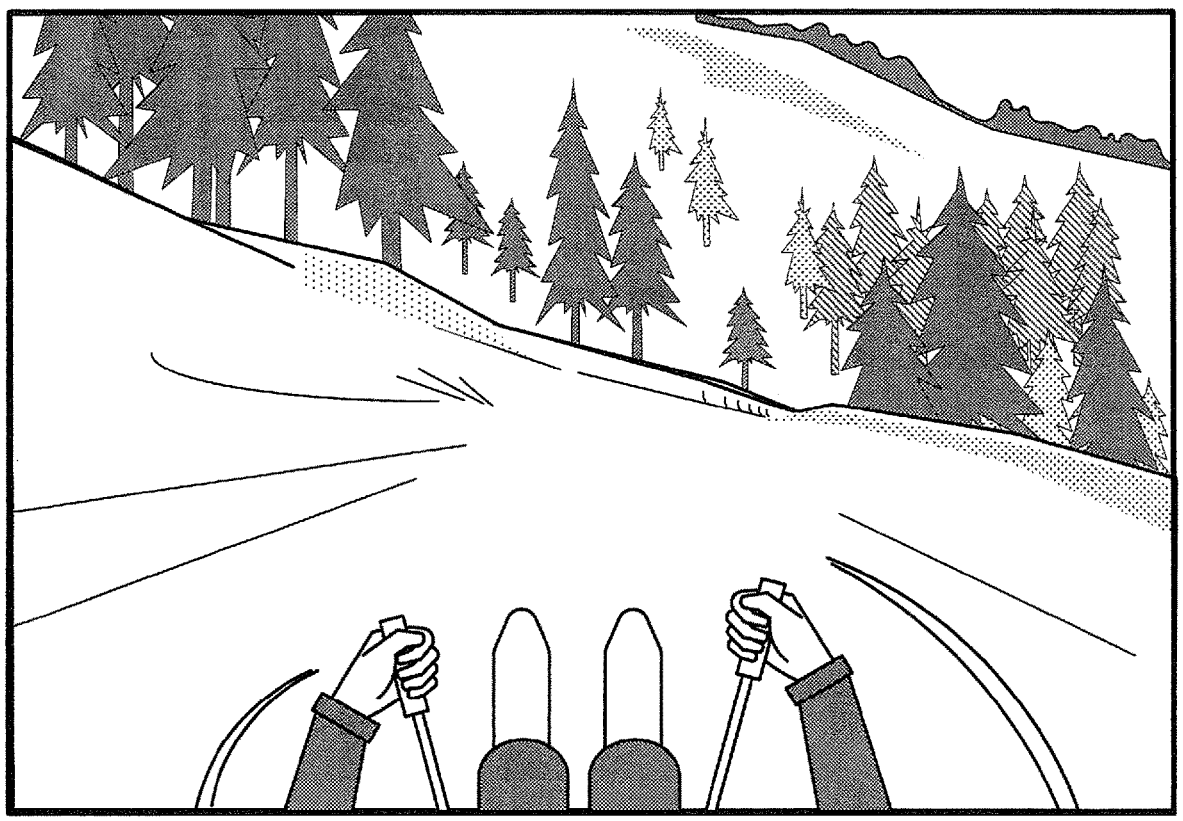
FIG. 5 illustrates an example of a game image for the ski simulator.

FIG. 5 illustrates an example of a game image (simulation image) displayed on the HMD 200 in the ski simulator in FIG. 4. This game image is what is known as a first person point-of-view image. The game image in FIG. 5 is displayed with realistic images of a ski course on which the virtual user (virtual skier), corresponding to the user, glides, and the scenery around the course. These images are displayed to the user as what is known as stereoscopic images through the HMD 200. In the game image, a body part of the virtual user, a ski board, and/or a skipole is displayed as appropriate. For example, in FIG. 4, when the user directs his or her line-of-sight downward, the change in the line-of-sight direction is detected through the process described with reference to FIG. 2A to FIG. 3B, and a body part (such as a hand or a foot) of the virtual user, a ski board, and/or a skipole is displayed on the game image as in FIG. 5. Thus, the user can feel the virtual reality as if he or she is skiing as an actual skier, in the virtual space.

FIG. 6 is a perspective view illustrating a configuration example of a robot simulator (robot game device) as an example of the simulation system. The movable casing 40 illustrated in FIG. 6 has a cover section 451 and a base section 452 (base) provided over a bottom section 450 (base section) in this order. The base section 452 is provided with a seat support section 464. A ride section 460 is formed with a seat 462 attached on the seat support section 464.

The base section 452 is provided with a movement section 470. Specifically, the base section 452 is provided with rail sections 454 and 455, and the movement section 470 is provided to be movable in a direction along the rail sections 454 and 455.

The movement section 470 has a support section 472 with an upper end provided with an upper surface section 473 (operation board). The upper surface section 473 is provided with the operation levers 161 and 162 and a game controller 165 having a sensor section. The sensor section of the game controller 165 detects at least one of the position and the direction. The operation levers 161 and 162 are part of the operation section 160 in FIG. 1. When the user manually operates the operation levers 161 and 162, the virtual user in a cockpit of the robot in the virtual space is displayed to operate the operation levers in the cockpit accordingly.

When the user pushes down the operation levers 161 and 162 forward, the robot in the virtual space moves forward. When the user pulls down the operation levers 161 and 162 rearward, the robot in the virtual space moves rearward. When the user pushes down the operation levers 161 and 162 rightward or leftward, the robot moves rightward or leftward. By pushing down one of the operation levers 161 and 162 forward, and pulling down the other one rearward, the orientation of the robot can be changed.

The game controller 165 is provided with at least one light receiving element used as a sensor section. A detection function (a function of detecting at least one of the position and the direction) of the sensor section of the game controller 165 is implemented with a process similar to the tracking process illustrated in FIGS. 2A and 2B. With this detection function, a change in the play position (the ride position and the seated position of the ride section 460) due to the movement of the movable casing 40 can be detected for example.

The support section 472 of the movement section 470 has a lower end provided with a lower surface section 474 provided with the accelerator pedal 163 and the brake pedal 164. When the user depresses the accelerator pedal 163, the robot makes a dash movement that is an accelerated movement in the virtual space. When the user depresses the brake pedal 164, the movement of the robot stops.

The base section 452 of the movable casing 40 is provided with a frame section 430. The frame section 430 has a guide section 432 that guides the cable 20 from the processing device. For example, the cable 20 is guided through a predetermined route from the lower side to the upper side for example. The guided cable 20 is connected to the HMD 200 via the via point TP. Specifically, the cable 20 is fixed by a fixing jig 433 at the via point TP to be connected to the HMD 200.

The seat 462 of the ride section 460 has a rear surface side provided with two unillustrated electric cylinders. With extension and contraction of rod sections of these electric cylinders, the orientation of the base section 452 changes. For example, the orientation change such as pitching and/or rolling of the base section 452 is implemented. For example, when the rod sections of the two electric cylinders simultaneously extend, the orientation change corresponding to the pitching of the base section 452 toward the forward side is implemented. When the rod sections of the two electric cylinders simultaneously contract, the orientation change corresponding to the pitching of the base section 452 toward the rearward side is implemented. When one of the rod sections of the two electric cylinders extends and the other one contracts, orientation change corresponding to rightward or leftward rolling of the base section 452 is implemented. Through the orientation change corresponding to the pitching and/or rolling of the base section 452, pitching and/or rolling can be implemented for the orientation of the user's body.

Figure 7:
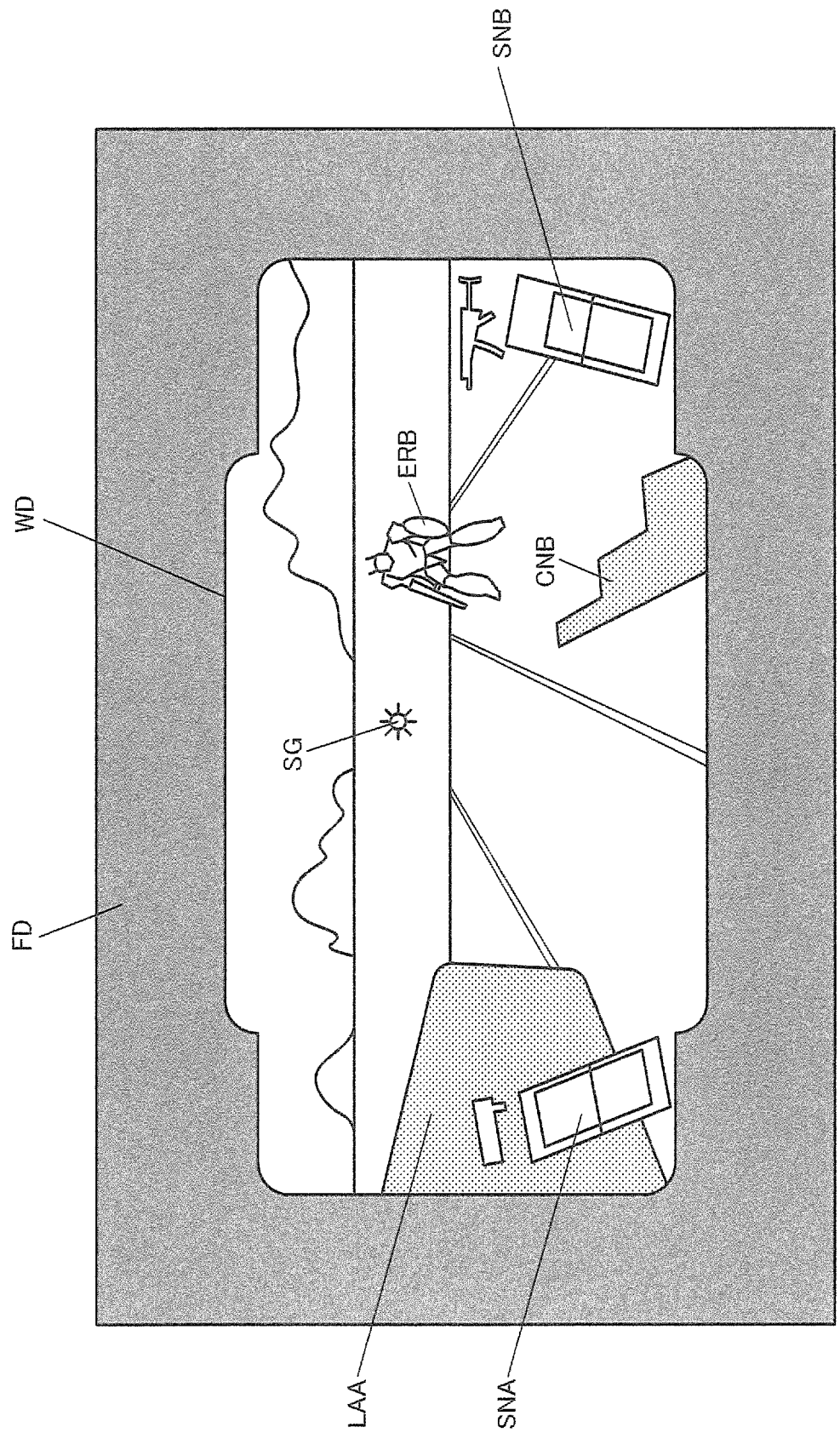
FIG. 7 illustrates an example of a game image for the robot simulator.

FIG. 7 illustrates an example of the game image displayed on the HMD 200 in the robot simulator in FIG. 6. In the present embodiment, a game image is generated for a robot game in which the virtual user corresponds to the user in the cockpit of the robot in the virtual space to fight an enemy robot etc. When the robot makes a sortie, a hood of the cockpit is closed in the virtual world. Then, the user (virtual user) operates the robot in the cockpit with a limited space to enjoy the game of fighting with an enemy robot etc.

As illustrated in the game image in FIG. 7, a hood FD of a Visual Flight Rules cockpit of the robot in the virtual world is provided with a window WD, through which the user can see the outside. On the window WD in FIG. 7, an enemy robot ERB, cross hairs SG, and a map of the battle field are displayed. Furthermore, missile launcher LAA and cannon CNB as weapons of the robot operated by the user, and ammunition counter icons SNA and SNB indicating the remaining ammunitions of these weapons are displayed.

The cross hairs SG move to follow the movement of the line-of-sight (head, HMD) of the user wearing the HMD 200. For example, the cross hairs SG on the game image move rightward when the user turns his or her head rightward, and move leftward when the user turns his or her head leftward. The user enjoys the battle game by moving the position of the cross hairs SG to the position of the enemy robot ERB, and attacking the enemy robot by firing the launcher LAA and/or the cannon CNB.

The apparatus implementing the simulation system according to the present embodiment is not limited to those illustrated in FIG. 4 and FIG. 6. For example, the simulation system according to the present embodiment can be applied to various apparatuses using an HMD as a display section including a consumer game apparatus, an arcade game apparatus, a PC, a portable information terminal, and a large attraction system where a large number of users play the game. The simulation system according to the present embodiment can be implemented with a server system to which a plurality of terminal devices (such as a game device, a PC, and a portable information terminal) are communicably connected through a network. In such a case, the processes according to the present embodiment may be implemented as a process performed by the simulation system and the terminal device in cooperation.

4. Method According to the Present Embodiment

Next, a method according to the present embodiment will be described in detail. The following description is given mainly based on an example where the method according to the present embodiment is applied to the ski game using the ski simulator in FIG. 4. The present embodiment is not limited to this and can be applied to various games (a roll playing game (RPG), a robot battle game, an action game, a battle game, a racing game, a sport game, a thriller experience game, a simulation game for rides such as trains and aircrafts, a puzzle game, a communication game, or a music game) and to something other than games. The following description is given based on an example where the moving body is a character serving as a virtual user. Alternatively, the moving body may be a ridden moving body such as a robot, a car, an aircraft, or a train ridden by the virtual user.

4.1 Display Process at Time of Change in Acceleration, Line-of-Sight Direction

Figure 8A:
FIG. 8A to FIG. 8C are diagrams illustrating a problem caused by a change in acceleration due to a character colliding with a rock.

FIG. 8A is a diagram illustrating a character CH (moving body in a broad sense) as a skier (virtual user) gliding to travel on a course in a virtual space. A virtual camera is set to be at the position of the point-of-view of the character CH corresponding to the virtual user in the virtual space, and an image as viewed from the virtual camera is (stereoscopically) displayed on the HMD 200 as illustrated in FIG. 5. Thus, the image in the first person point-of-view can be displayed on the HMD 200 for example, and thus the user can feel virtual reality as if he or she is actually the skier traveling on the course in the virtual space.

Figure 8B:
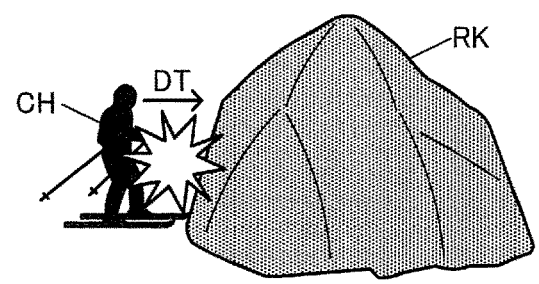
Figure 8C:
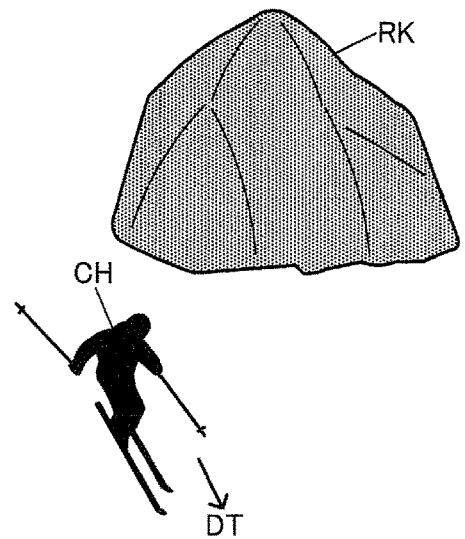

FIG. 8A illustrates a state where a rock RK (possible collision object) is in front of (in the traveling direction) of the character CH, and FIG. 8B illustrates collision between the character CH and the rock RK. As a result, a traveling direction DT of the character CH is changed as illustrated in FIG. 8C.

The collision event with the rock RK is the acceleration change event that changes the traveling direction DT of the character CH (moving body) to a different direction. For example, the traveling direction DT of the character CH is changed from the forward direction to the rightward direction due to the collision with the rock RK. Such a process of changing the traveling direction DT can be implemented through a calculation process for the collision between the character CH and the rock RK for example (hit check process). This collision calculation process can be implemented with a physical calculation process based on reaction force received by the character CH as a result of the collision with the rock RK. For example, the physical calculation process is performed to change the traveling direction DT of the character CH as illustrated in FIG. 8C in accordance with the reaction force received as a result of the collision in FIG. 8B.

Figure 9A:
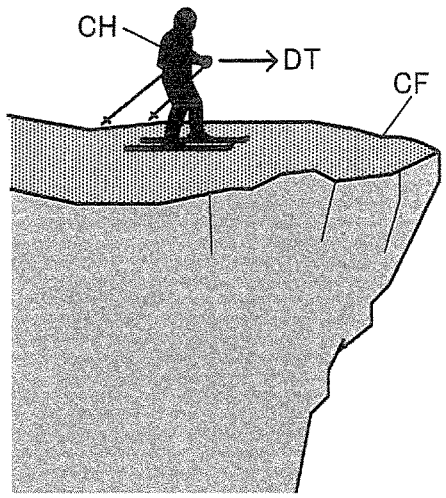
FIG. 9A to FIG. 9C are diagrams illustrating a problem caused by a change in acceleration due to the character falling from a cliff.
Figure 9B:
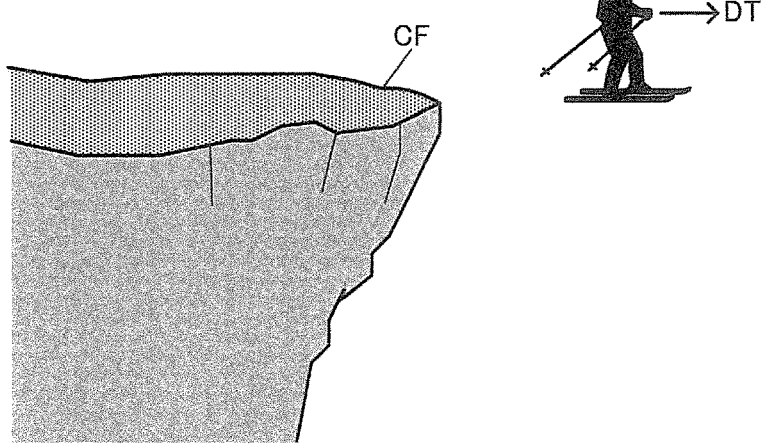
Figure 9C:
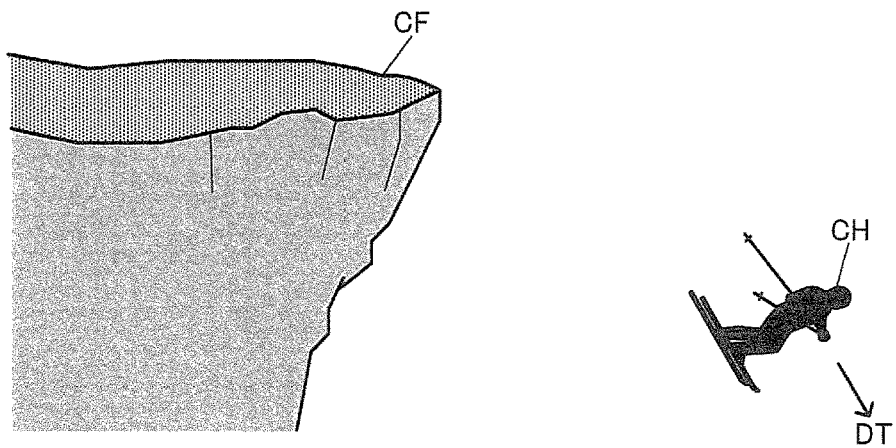

FIG. 9A illustrates a state where the character CH as a skier is traveling close to a cliff CF, and FIG. 9B illustrates a state where the character CH is falling off the cliff CF. As a result of the falling off the cliff CF, the traveling direction DT of the character CH is changed as illustrated in FIG. 9C.

This falling off event from the cliff CF is also the acceleration change event that changes the traveling direction DT of the character to a different direction. For example, the traveling direction DT of the character CH is changed from the forward direction to the downward direction due to the falling from the cliff CF. Such a process of changing the traveling direction DT can be implemented through a calculation process for the movement of the character CH falling off the cliff CF for example. The calculation process for the falling off movement can be implemented with a physical calculation process based on the gravity on the character CH falling off the cliff CF. For example, the physical calculation process is performed to change the traveling direction DT of the character CH as illustrated in FIG. 9C in accordance with the gravity as a result of the falling in FIG. 9B.

A large change in the traveling direction DT of the character CH as a result of such collision with the rock or such falling off the cliff results in a large change in the display image on the HMD as illustrated in FIG. 5. The large change in the display image on the HMD results in a problem such as 3D sickness for example. For example, the 3D sickness is sort of motion sickness, such as dizziness, experienced by a person continuously watching stereoscopic video involving a large amount of movement.

For example, a large change in the traveling direction DT of the character CH as illustrated in FIG. 8C as a result of the collision with the rock RK illustrated in FIG. 8B results in a large change in the line-of-sight direction of the virtual camera following the character CH. For example, in a case of the first person point-of-view, the virtual camera is set at the position of the point-of-view of the character CH, and the line-of-sight direction of the virtual camera is directed along the traveling direction DT of the character CH. Thus, the large change in the traveling direction DT as illustrated in FIG. 8C leads to a large change in the line-of-sight direction of the virtual camera, resulting in a large change in the display image on the HMD illustrated in FIG. 5.

Such a sharp change in the display image on the HMD due to the collision event is a virtual event in the virtual space (virtual collision), and thus has discrepancy from the event in the real world. Such a sharp change in the display image on the HMD deviated from the real world will result in the user feeling 3D sickness.

In such a case, the movable casing 40 in FIG. 4 may be operated, at the time of collision with the rock as illustrated in FIG. 8B for example, to make the user feel the reaction force due to the collision, and thus the discrepancy between the real world and the virtual world can be reduced to alleviate the 3D sickness felt by the user. For example, the air spring sections 50 to 53 may be slightly extended and contracted so that the user can somewhat feel the vibrations due to the collision with the rock.

However, the collision can be virtually experienced using the movable casing 40 but is only for a limited level, and thus there is huge discrepancy between the sharp change in the image of the virtual world displayed on the HMD and the perception of the user in the real world. Specifically, while the user in the real world did not actually collide with the rock, only the image of the virtual world largely fluctuates due to the collision with the rock. When such an event frequently occurs, the user will feel 3D sickness or the like.

Furthermore, even when the falling from cliff in FIG. 9A to FIG. 9C occurs, the user in the real world in FIG. 4 cannot feel the gravitational acceleration due to the falling. Thus, there is discrepancy between the event in the virtual space (falling off the cliff) and the event in the real world (not falling off the cliff). Such a change in the display image on the HMD deviated from an event in the real world will result in the user feeling 3D sickness.

Thus, in the present embodiment, when the acceleration change event such as the collision event or the falling off event of the character is determined to have occurred, the process of changing the display image on the HMD to an image different from the image as viewed from the virtual camera is performed. For example, when the change in the acceleration of the character (moving body) is determined to have satisfied the given change condition, the display image on the HMD is changed to an image different from the image as viewed from the virtual camera. For example, the display process of entirely changing the display image on the HMD is performed. Examples of the display process include a process of fading out the display image, and a process of performing the effect process on the image as viewed from the virtual camera.

Figure 10A:
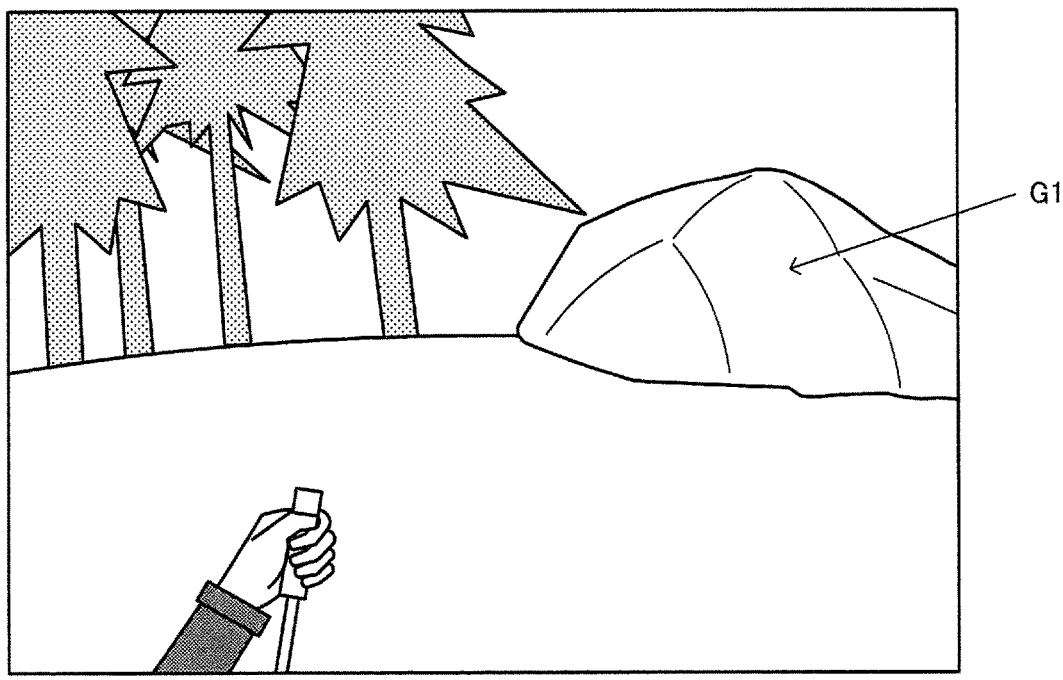
FIG. 10A and FIG. 10B illustrate game image illustrating a scene where the character collides with a rock.
Figure 10B:
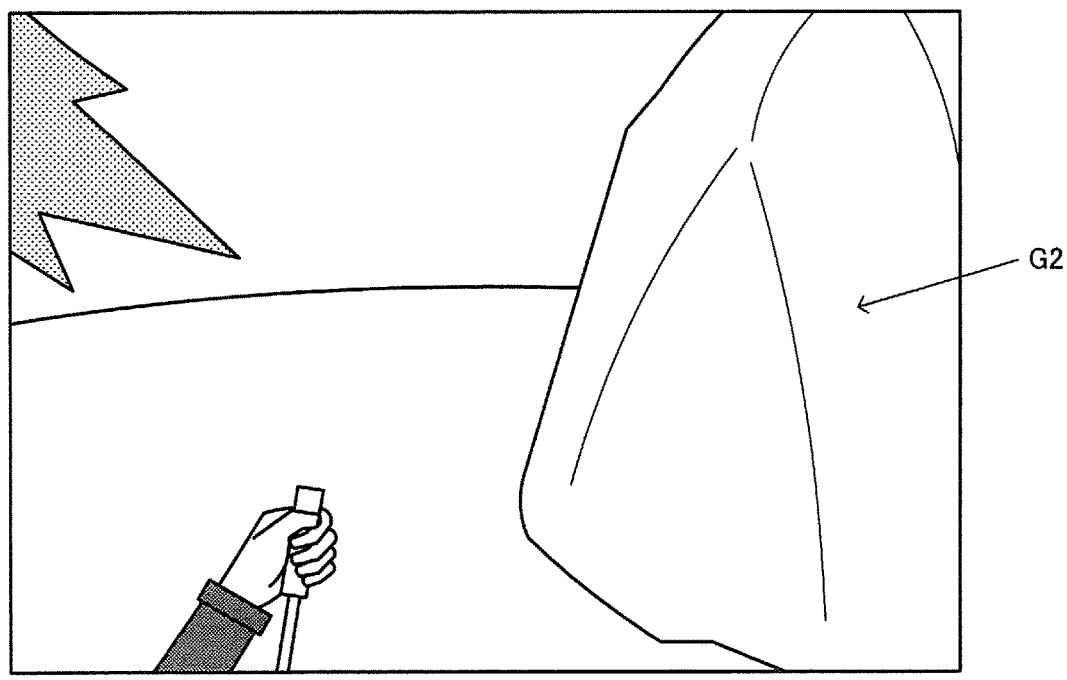

FIG. 10A illustrates an example of the image displayed on the HMD while the character CH is traveling in a direction toward the rock RK as illustrated in FIG. 8A. As illustrated in G1 in FIG. 10A, a rock is in a forward direction (traveling direction side) of the character CH. FIG. 10B is an image at the point of collision with the rock illustrated in G2, and corresponds to the situation illustrated in FIG. 8B. Such collision with the rock causes a large change in the traveling direction DT of the character CH as illustrated in FIG. 8C, leading to a massive change in the display image on the HMD, resulting in a problem such as the user feeling 3D sickness.

Figure 11A:
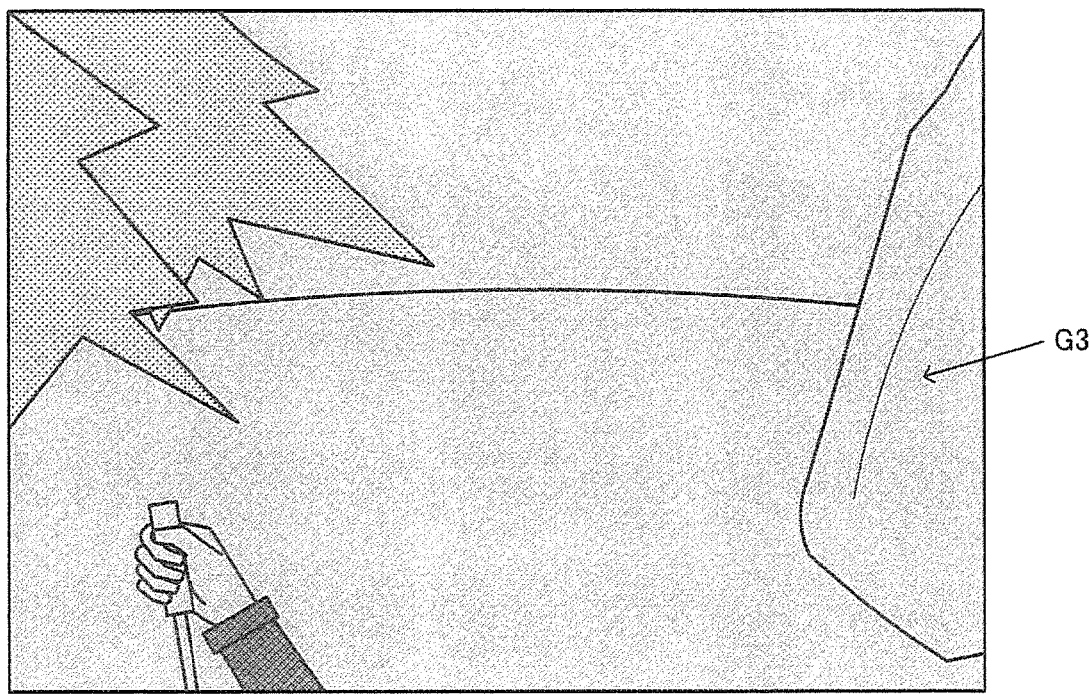
FIG. 11A and FIG. 11B illustrate an example of game images for describing a fadeout process for a scene where the character collides with a rock.
Figure 11B:
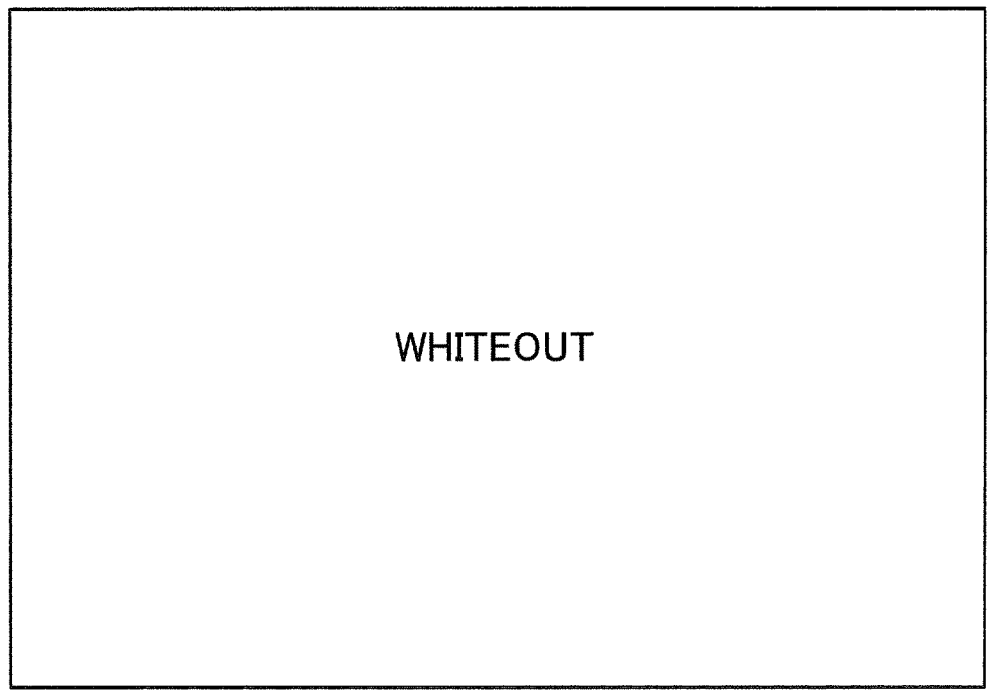

Thus, in the present embodiment, when the acceleration change event such as this collision event occurs (when the acceleration change satisfies the given change condition in a broad sense), a fadeout process as illustrated in FIG. 11A and FIG. 11B is performed. For example, as illustrated in FIG. 11A, the fadeout process for the display image (the image as viewed from the virtual camera) is performed, so that the entire screen is eventually whited out as illustrated in FIG. 11B. For example, in FIG. 11A, the image of the rock illustrated in G3 has a whiter color than the image of the rock in FIG. 10A and FIG. 10B.

In such a case, for example, after the character CH has collided with the rock RK as illustrated in FIG. 8B, the normal game image (simulation image) as illustrated in FIG. 10A and FIG. 10B is displayed on the HMD for a given period of time. When the fadeout process start timing arrives due to the elapse of the given period of time, the fadeout process (whiteout process) as illustrated in FIG. 11A and FIG. 11B starts.

Figure 12A:
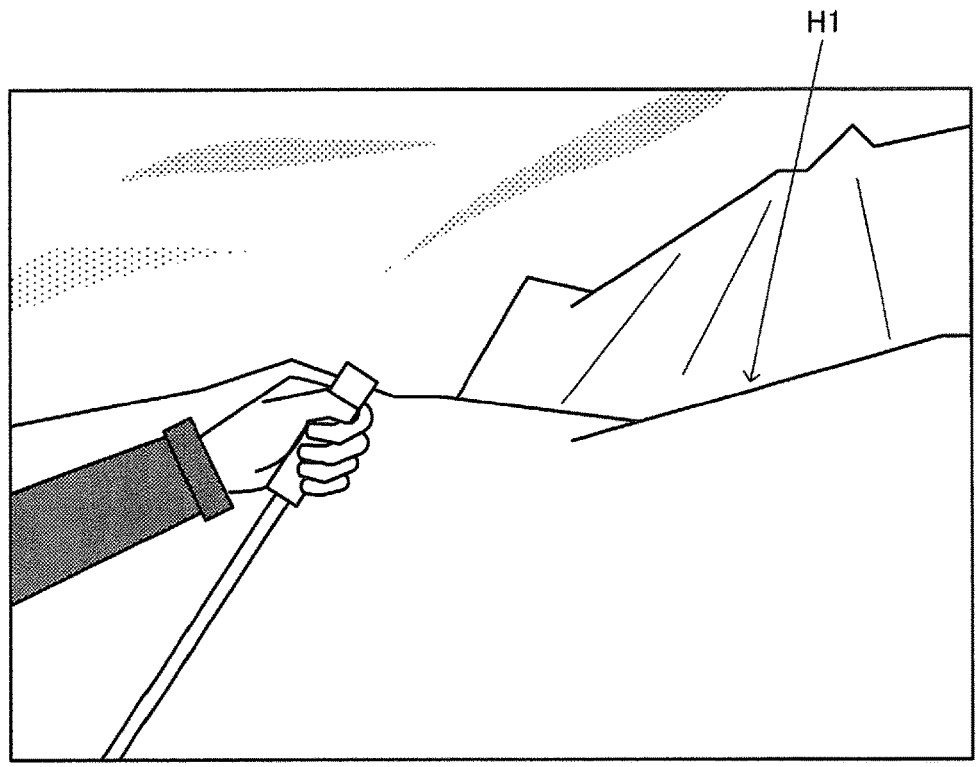
FIG. 12A and FIG. 12B illustrate an example of game images for describing a scene where the character falls off a cliff.
Figure 12B:
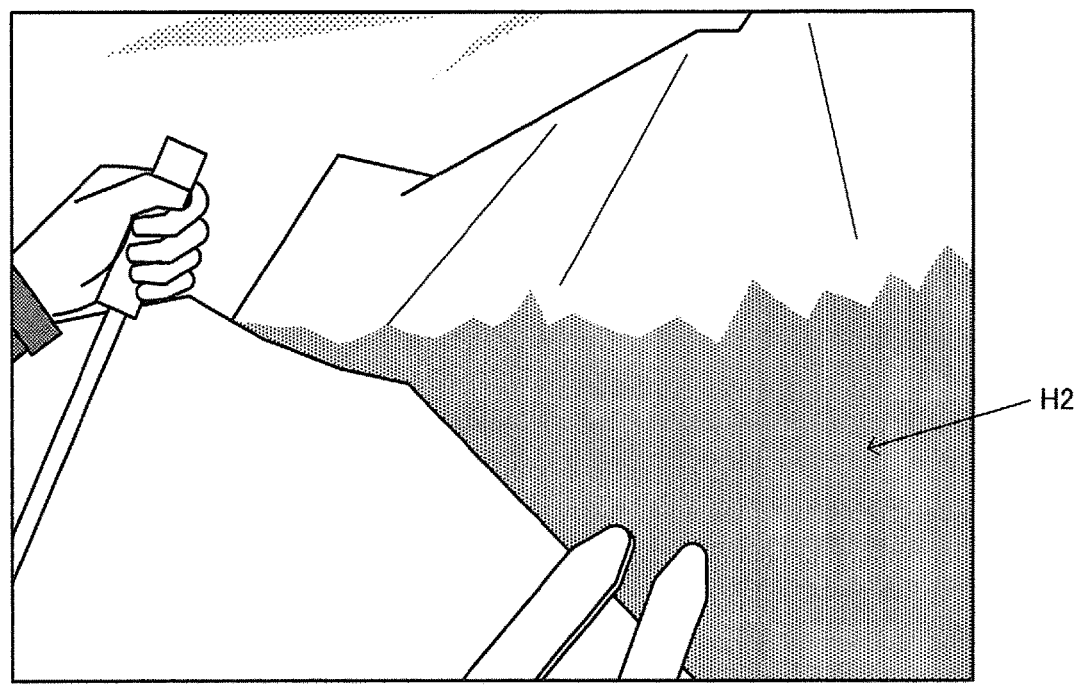

FIG. 12A and FIG. 12B illustrate images displayed on the HMD in a scene where the character CH falls off the cliff CF, as illustrated in FIG. 9A and FIG. 9B. Specifically, in FIG. 12A, the character CH is traveling toward the cliff indicated by H1, and in FIG. 12B, the character CH is falling off the cliff as indicated by H2. Such falling from the cliff causes a large change in the traveling direction DT of the character CH as illustrated in FIG. 9C, leading to a massive change in the display image on the HMD, resulting in a problem such as the user feeling 3D sickness.

Figure 13A:
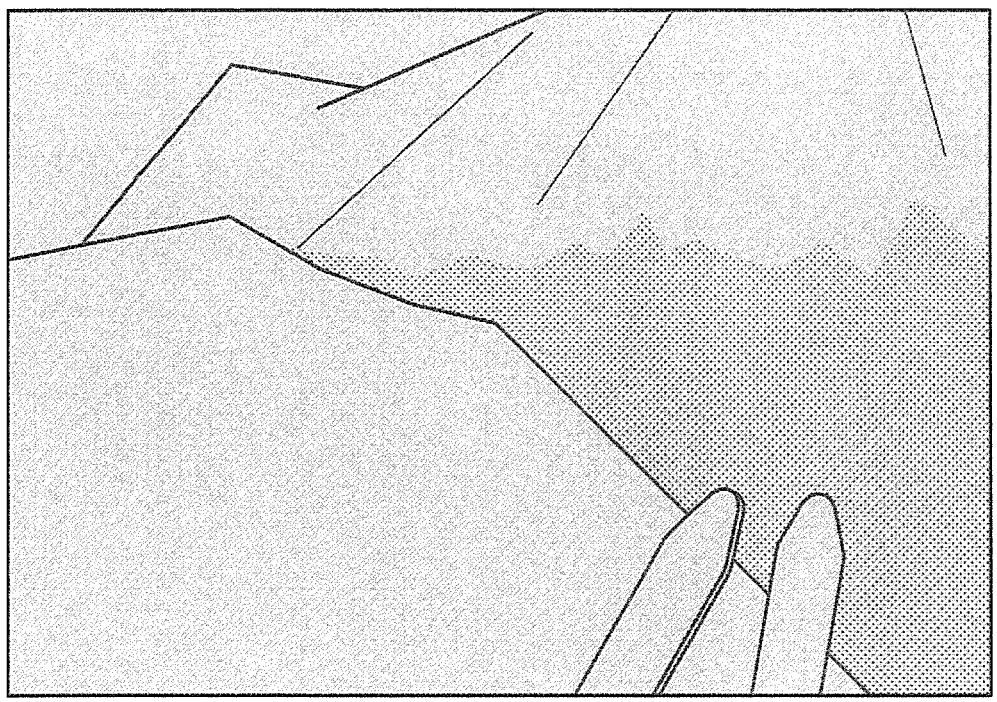
FIG. 13A and FIG. 13B illustrate an example of game images for describing a fadeout process for a scene where the character falls off a cliff.
Figure 13B:
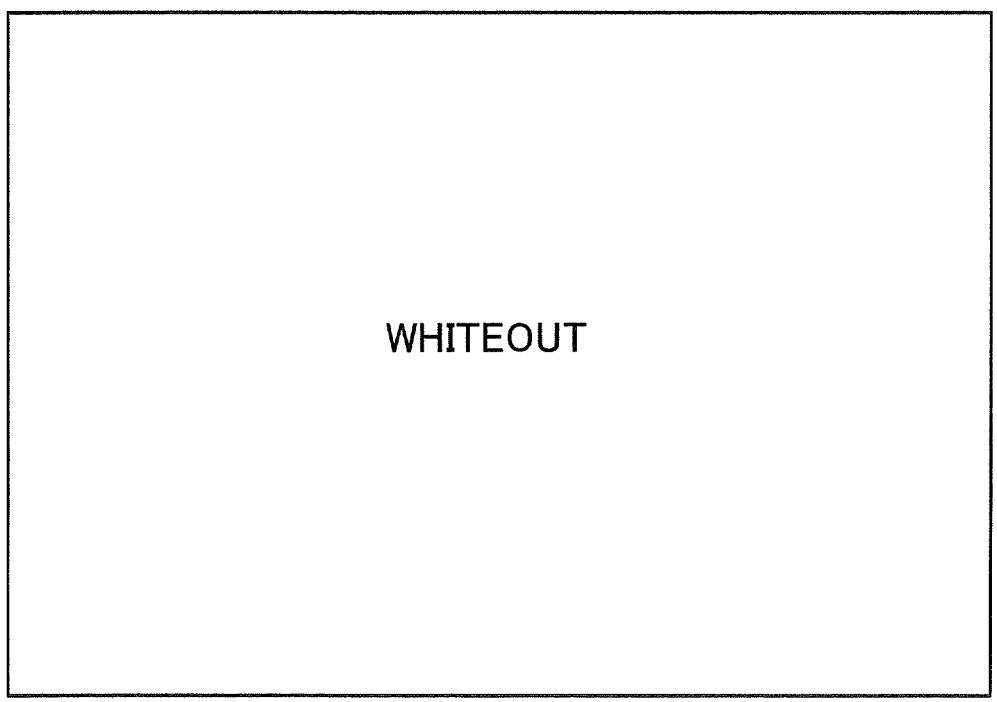

Thus, in the present embodiment, when the acceleration change event such as this falling off event occurs, a fadeout process as illustrated in FIG. 13A and FIG. 13B is performed. For example, as illustrated in FIG. 13A, the fadeout process for the display image starts, so that the entire screen is eventually whited out as illustrated in FIG. 13B.

In such a case, for example, after the character CH has fallen off the cliff CF as illustrated in FIG. 9B and FIG. 9C, the normal game image (simulation image) as illustrated in FIG. 12B is displayed on the HMD for a given period of time. When the fadeout process start timing arrives due to the elapse of the given period of time, the fadeout process (whiteout process) as illustrated in FIG. 13A and FIG. 13B starts.

As described above, in the present embodiment, when the change in the acceleration of the character CH (moving body) is determined to have satisfied the given change condition, the display image on the HMD is changed to an image different from the image as viewed from the virtual camera (the normal game image, simulation image). Specifically, when the acceleration change event such as the collision event or the falling off event occurs, the fadeout process is performed so that the entire screen fades out. These acceleration change events are events that change the traveling direction DT of the character CH to a direction different from the traveling direction.

Figure 14A:
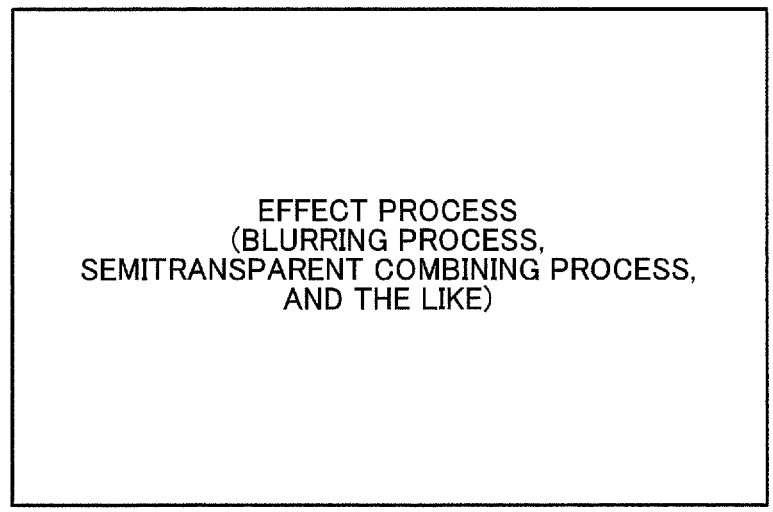
FIG. 14A and FIG. 14B are diagrams illustrating an effect process according to the present embodiment.
Figure 14B:
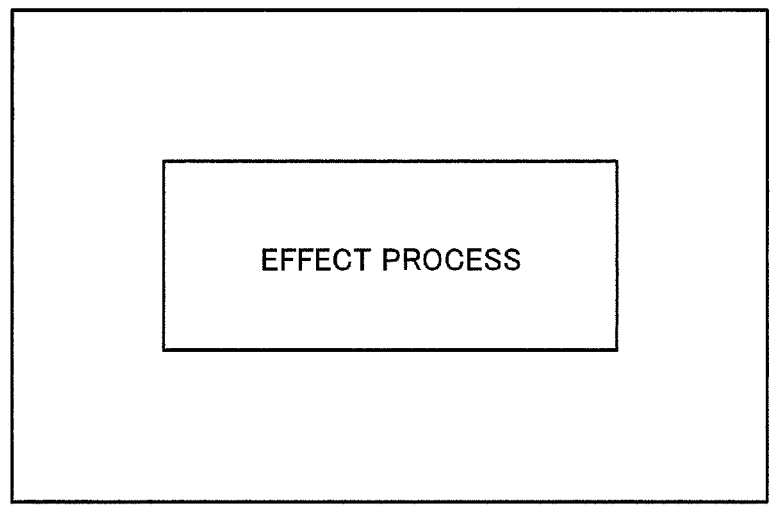

The process performed when the acceleration change event (change condition is satisfied) is not limited to this fadeout process. For example, the effect process such as a blurring process or a semitransparent combining process may be performed as illustrated in FIG. 14A. For example, in FIG. 14A, the effect process is entirely performed on the display image. For example, the blurring process is performed so that the display image on the HMD is entirely blurred. In such a case, the blurring level (the process level of the display process in a broad sense) may be gradually raised after the start timing of the blurring process. The semitransparent combining process can be implemented with a predetermined semitransparent image combined with the image as viewed from the virtual camera, In such a case, the semitransparent combining ratio of the semitransparent target image (the process level of the display process in a broad sense) may be gradually increased from the start timing of the semitransparent combining process. Examples of various process that can be contemplated as the effect process in such a case include a binarization process and a mosaic process. The effect process may be implemented by performing an image filter process on the image as viewed from the virtual camera (original image) for example. Examples of various processes that can be contemplated as the image filter process include a moving average filter process, a Gaussian filter process, or a median filter process. As illustrated in FIG. 14B, the effect process (image filter process) may be performed only on a partial area (a main area in a central portion for example) of the display image.

In the present embodiment, when the change in the line-of-sight direction of the virtual camera is determined to have satisfied the given change condition, the display image on the HMD may be changed to an image different from the image as viewed from the virtual camera. For example, the fadeout process or the effect process is performed when the change event of the line-of-sight direction of the virtual camera occurs for example.

Figure 15A:
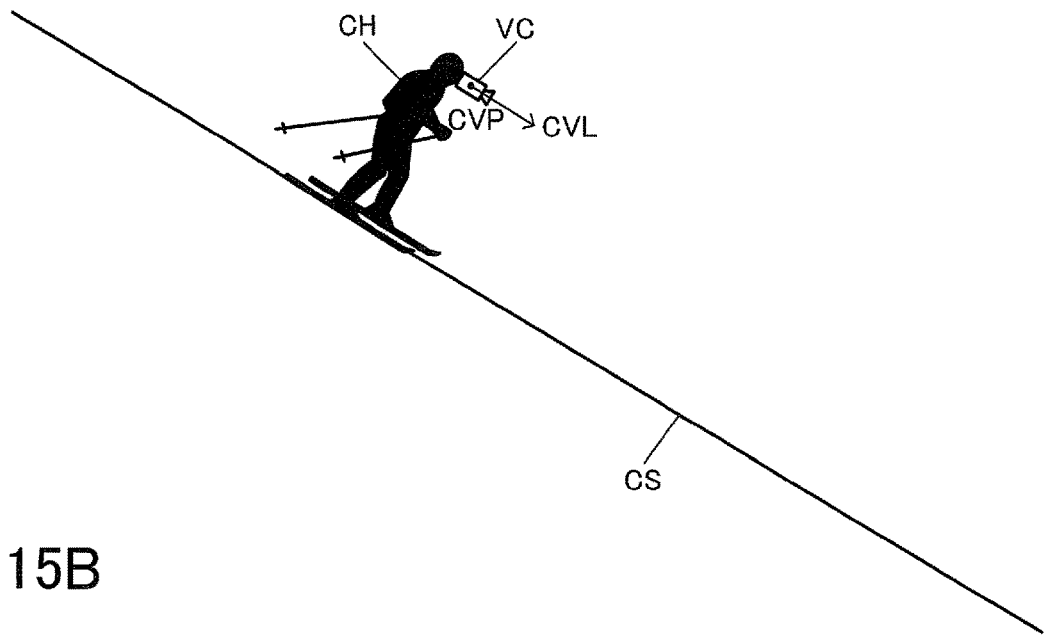
FIG. 15A to FIG. 15C are diagrams describing a problem caused by a change in a line-of-sight direction of a virtual camera as a result of the character falling down.
Figure 15B:
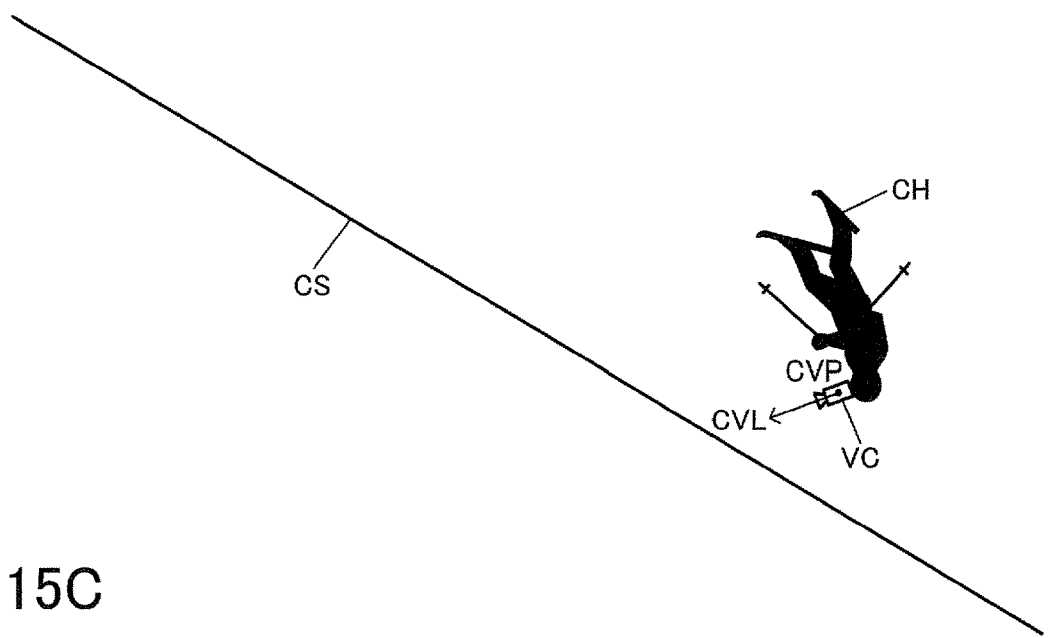
Figure 15C:
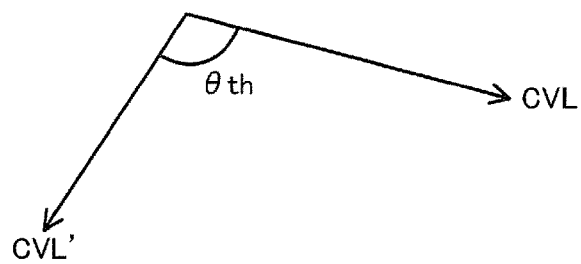

For example, in FIG. 15A, the character CH that is the moving body is traveling on a course CS. The virtual camera VC is set to be at the point-of-view position of the character CH, whereby a first person point-of-view image is generated. In FIG. 15B, the character CH has fallen down, and thus a line-of-sight direction CVL of the virtual camera VC is massively changed accordingly. Also in such a case, the fadeout process as described above with reference to FIG. 11A, FIG. 11B, FIG. 13A, and FIG. 13B or the effect process as described above with reference to FIG. 14A and FIG. 14B is performed for example. Specifically, the process of entirely changing the display image on the HMD is performed. More specifically, as illustrated in FIG. 15C, the given change condition is determined to have been satisfied when the angular change of the line-of-sight direction CVL of the virtual camera VC is equal to or larger than a given angle $\theta th$, and the display image on the HMD is changed to an image different from the image as viewed from the virtual camera VC. For example, when the line-of-sight direction CVL of the virtual camera VC is determined to have changed by the angle $\theta th$ or more to be CVL' due to the falling down, the fadeout process or the effect process is performed on the display image.

As described above, in the present embodiment, when the change in the acceleration of the moving body or in the line-of-sight direction of the virtual camera satisfies the given change condition, the display image on the HMD is changed to an image different from the image as viewed from the virtual camera. Specifically, when the acceleration change event such as the collision event or the falling off event or the line-of-sight direction of the virtual camera change event such as the falling down event occurs, the display process of entirely changing the display image on the HMD is performed. Specifically, the process of fading out the display image is performed or the effect process (altering process) is performed on the display image.

With this configuration, when the acceleration change event or the line-of-sight direction change event occurs, the problem such as 3D sickness due to a load on the user's eye and the like as a result of massive movement or shaking of the display image on the HMD can be effectively prevented.

For example, users who are not familiar with the game or beginners frequently go through events such as collision, falling off, and falling down, during their gameplay. This may lead to frequent massive change in the display image on the HMD, which may result in problems such as 3D sickness. For example, when the acceleration change event such as the collision event or the falling off event occurs in the virtual space with no acceleration applied to the user in the real world, the corresponding display image is displayed on the HMD with discrepancy between the event in the real world and the event in the virtual world. When the line-of-sight direction of the virtual camera massively changes due to the falling down event or the like in the virtual space with no change in the line-of-sight direction of the user in the real world, the corresponding display image is displayed on the HMD with discrepancy between the event in the real world and the event in the virtual world. Such discrepancy between the events in the real world and the virtual world will make the user feel 3D sickness.

In view of this, in the present embodiment, the fadeout process or the effect process is performed when the acceleration change event or the line-of-sight direction change event occurs, and thus the game is temporarily stopped. Thus, the discrepancy between the events in the real world and the virtual world last only for a short period of time, whereby a load on the user's eyes due to the shaking of the display image on the HMD can be reduced. For example, the game restarts at or around a location of the occurrence of the event. For example, the game restarts from a location that is more on the start point side than the location of the of the occurrence of the event such collision, falling off, or falling down, and the user can normally resume the game. Thus, even when a user who is not familiar with the game or the beginner repeats the collision, falling off, or falling down, a load on the user's eyes and the like can be sufficiently reduced, whereby the 3D sickness can be effectively prevented.

Figure 16A:
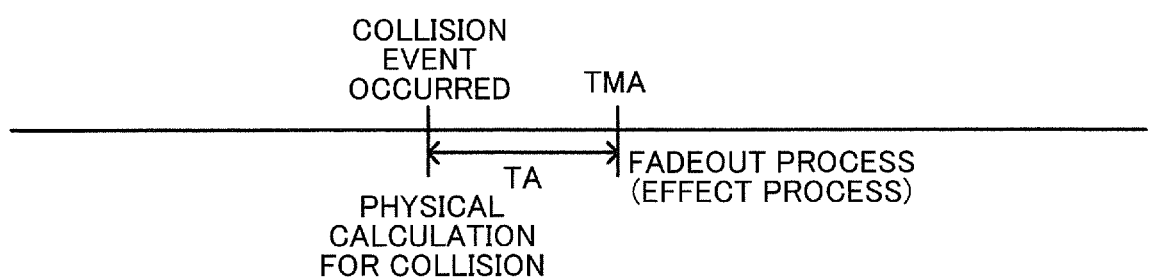
FIG. 16A and FIG. 16B are diagrams illustrating a method of setting start timings of the fadeout process and the effect process in accordance with each event.
Figure 16B:
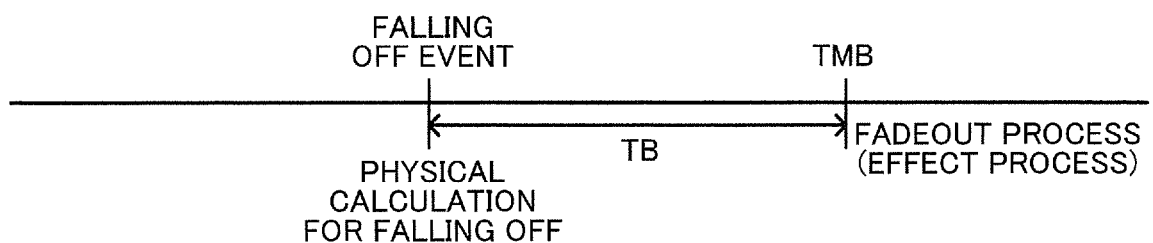

FIG. 16A and FIG. 16B are diagrams illustrating the fadeout process at the time of occurrence of an event such as collision or falling off in detail. In the present embodiment, the process start timing and the process level of the display process of changing to an image different from the image as viewed from the virtual camera is set to be different between a case where the first event satisfying the given change condition occurs and a case where the second event satisfying the given change condition occurs. In an example described below, the process of changing to an image different from the image as viewed from the virtual camera is the fadeout process. However, the process may be the effect process illustrated in FIG. 14A and FIG. 14B and the like.

For example, as illustrated in FIG. 16A, when the collision event occurs, a physical calculation process for the collision is performed. For example, as illustrated in FIG. 8B, when the character CH collides with the rock RK, the physical calculation process is performed based on the traveling direction DT of the character CH at the time of collision and information about the collision surface of the rock RK (shape information, information indicating a direction the collision surface is facing), and the traveling direction DT after the collision is obtained. For example, as illustrated in FIG. 8C, the process of making the character CH move in the traveling direction DT obtained is performed.

Here, the fadeout process (effect process) does not start until a given period of time TA elapses as illustrated in FIG. 16A. In the period of time TA, a normal game image is displayed. For example, the image as viewed from the virtual camera in a case where the traveling direction DT changes due to collision is displayed on the HMD. Then, the fadeout process starts after the period of time TA elapses.

When the falling off event occurs as illustrated in FIG. 16B, the physical calculation process for the falling off is performed. For example, when the character CH falls off the cliff CF as illustrated in FIG. 9B, the physical calculation process of obtaining the traveling direction of the character CH after falling off is performed based on information about the speed and the gravitational acceleration of the character CH. The process of making the character CH fall off in the traveling direction DT obtained is performed, as illustrated in FIG. 9C.

In such a case, as illustrated in FIG. 16B, the fadeout process (effect process) does not start until a given period of time TB elapses. In the period of time TB, a normal game image is displayed. For example, the image as viewed from the virtual camera in a case where the traveling direction DT changes due to falling off is displayed on the HMD. Then, the fadeout process starts after the period of time TB elapses.

With this configuration, the normal game image is displayed until the period of time TA or TB elapses after the event such as collision or falling off occurs, and then the fadeout process is performed, so that the unnaturalness felt by the user can be minimized. If the fadeout process is performed before the period of time TA or TB elapses, the fadeout process starts immediately after the collision or the falling off. This results in the user being unable to recognize the situation he or she is in, and thus the user might be confused or feel unnaturalness.

In view of this, in FIG. 16A and FIG. 16B, the normal game image is displayed until the period of time TA or TB elapses, and then the fadeout process is performed. Thus, the user can appropriately recognize that he or she has collided with the rock or has fallen off the cliff, by seeing the display image on the HMD during the period of time TA or TB.

Thus, the user can recognize the resultant situation of the collision or the falling off, whereby the user can be prevented from feeling unnaturalness and the like.

Furthermore, in the present embodiment, as is clear from FIGS. 16A and 16B, the process start timing of the fadeout process (a process of changing to an image different from the image as viewed from the virtual camera in a broad sense) is set to be different between events. For example, the process start timing of the fadeout process is different between the collision event (first event) and the falling off event (second event).

For example, in the collision event illustrated in FIG. 16A, a process start timing TMA is earlier. Thus, the period of time TA is shorter. On the other hand, a process start timing TMB of the falling off event in FIG. 16B is later than that in FIG. 16A. Thus, the period of time TB is longer than the period of time TA.

For example, the process start timing TMA is set to be early for the collision event to immediately start the fadeout process (effect process), so that the confusion of the user and the like due to the collision can be minimized. On the other hand, the process start timing TMB for the falling off event is set to be later than the process start timing TMA for the collision in FIG. 16A, so that the user can well observe how he or she is falling to make the game more dramatic. Thus, the display image on the HMD can make the user virtually experience how he or she is falling for a long period of time TB, to make the game more dramatic.

In the present embodiment, the process level of the fadeout process (a process of changing to an image different from the image as viewed from the virtual camera) may be set to be different between events. For example, the process level of the fadeout process is set to be different between the collision event (first event) and the falling off event (second event). For example, the process level of the fadeout process is set to be high for the collision event, so that the whiteout is completed in a shorter period of time. On the other hand, the process level of the fadeout process is set to be low for the falling off event, so that the whiteout is completed in a longer period of time compared with the collision event for example.

For example, as illustrated in FIG. 17A, information about process start timing TM1, TM2, TM3, . . . is associated with a corresponding one of each event EV1, EV2, EV3, . . . . The information about the process start timing is information identifying the time it takes for the display process such as the fadeout process or the effect process to start after the occurrence of the event for example. As illustrated in FIG. 17B, information about process levels PD1, PD2, PD3, . . . is associated with a corresponding one of each event EV1, EV2, EV3, . . . . Examples of the information about the process level include information identifying the time it takes for the fadeout to be completed after the fadeout process starts, and information identifying the level (such as the blurring level, the semitransparency, a filter coefficient) of the effect in the effect process. Thus, the process start timing or the process level can be set to be different between events occurred, so that the fadeout process or the effect process can be performed at the optimum process start timing or the optimum process level for each event.

4.2 Process of Disabling Orientation Change of Virtual Camera

Figure 18:
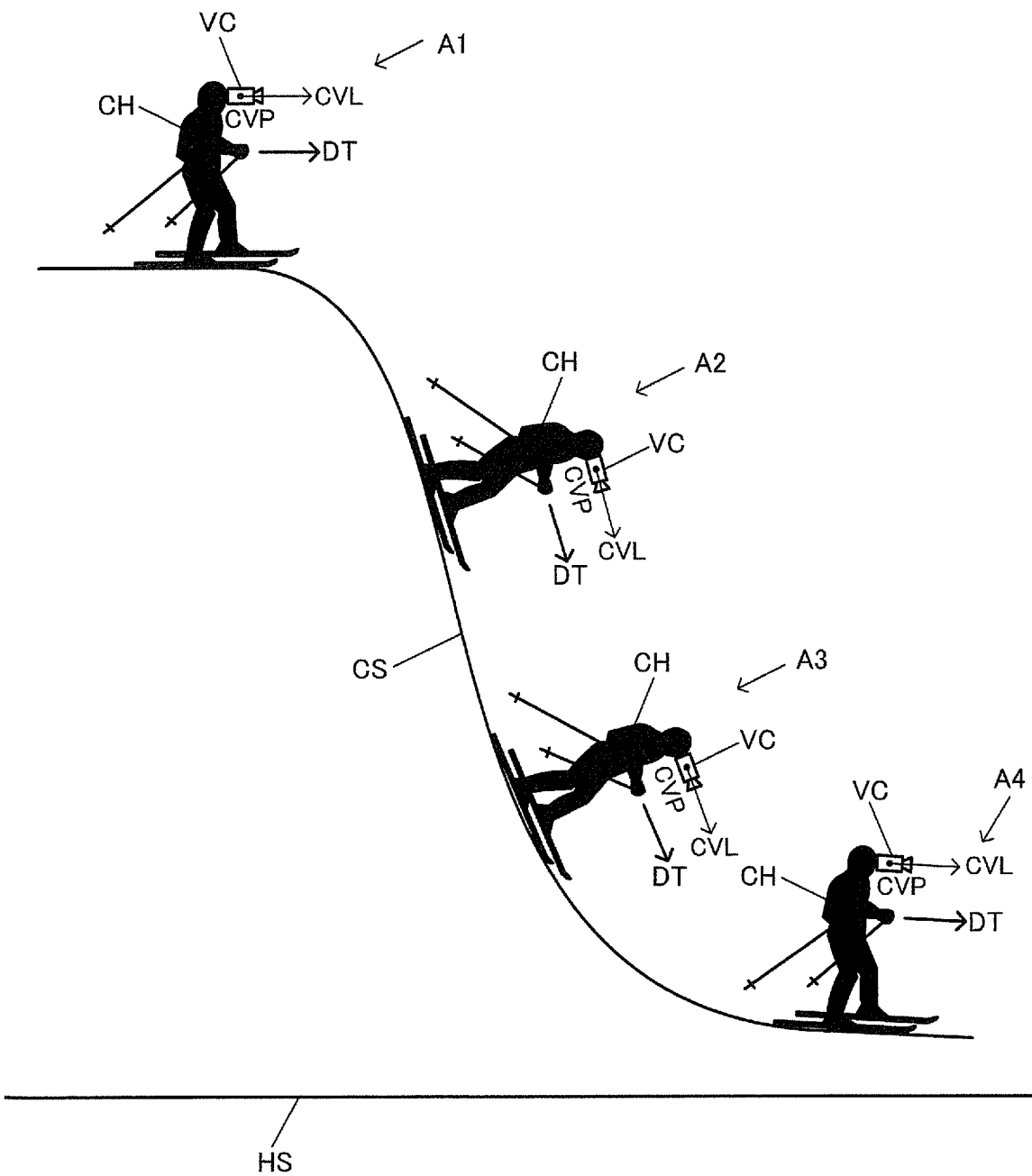
FIG. 18 is a diagram illustrating a problem caused by orientation change of a virtual camera in response to a change in a traveling direction of a moving body.

FIG. 18 is a diagram illustrating a character CH as a skier gliding to travel on the course CS in a virtual space. In FIG.

18, a horizontal plane HS is a horizontal plane (XZ plane) in the world coordinate system in the virtual space. In a flat course CS as illustrated in A1 in FIG. 18, the traveling direction DT of the character CH is in parallel (substantially parallel, the same applies to the following description) to the horizontal plane HS. The line-of-sight direction CVL of the virtual camera VC is also in parallel (substantially parallel) to the horizontal plane HS. A point-of-view position CVP of the virtual camera VC is set to be at the point-of-view position (the position of the eyes for example) of the character CH for example, whereby the first person point-of-view is implemented.

In A2 and A3 in FIG. 18, the character CH travels on the downhill course CS so that the traveling direction DT of the character CH has a depression angle relative to the horizontal plane HS. The character CH is taking a vertically (substantially vertical, the same applies to the following description) standing posture relative to the surface of the downhill course CS. Thus, the line-of-sight direction CVL of the virtual camera VC has a depression angle relative to the horizontal plane HS. Then, in A4, the character CH travels on the flat course CS, and thus the traveling direction DT and the line-of-sight direction CVL of the virtual camera VC return to be in parallel to the horizontal plane HS.

As described above, in FIG. 18, when the traveling direction DT changes as illustrated in A1 to A4 along with the traveling of the character CH on the course CS, the line-of-sight direction CVL of the virtual camera VC changes accordingly. When the first person point-of-view image is displayed on the HMD, generally, the line-of-sight direction CVL of the virtual camera VC changes in accordance with the change in the traveling direction DT as illustrated in FIG. 18. When the line-of-sight direction CVL of the virtual camera VC thus changes, the display image on the HMD in FIG. 5 largely changes in accordance with the change in the line-of-sight direction CVL. For example, in A1, A2, and A3 in FIG. 18, the display image changes from that as viewed in the line-of-sight direction CVL in parallel with the horizontal plane HS, to that as viewed in the line-of-sight direction CVL having a depression angle relative to the horizontal plane HS, and then in A4, the display image returns to that as viewed in the line-of-sight direction CVL in parallel with the horizontal plane HS. Thus, the display image on the HMD is largely shaken due to a large change in the line-of-sight direction CVL of the virtual camera VC as a result of the change in the traveling direction DT of the character CH. For example, when the course CS has small bumps, the display image is massively shaken in accordance with the bumps.

Such a shaken display image makes the user feel what is known as 3D sickness. For example, a skier in the real world gliding on a course with undulation as illustrated in FIG. 18 detects a change in the traveling direction (a change in the acceleration, a change in gravitational direction, and a change in centrifugal force) with his or her semicircular canal, and directs his or her line-of-sight direction to look toward the far side. Thus, no change in a viewed image occurs so as not to feel the sickness.

However, in a VR system in which the world of the virtual space is seen through the HMD, the change in the line-of-sight direction CVL of the virtual camera VC due to the change in the traveling direction DT as illustrated in FIG. 18 results in the display image on the HMD being shaken regardless of the intention and/or the feeling of the user. For example, despite the fact that the user in the real world is not actually traveling the downward or upward course, only the display image on the HMD changes in accordance with downward and upward inclination of the course in the virtual space, leading to deviation from the intention and feeling of the user, resulting in the 3D sickness.

In this context, the movable casing 40 in FIG. 4 has the base section 41 pitching about the X axis in accordance with the downward and upward inclination of the course in the virtual space, so that the user can somewhat feel the downward and upward inclination of the course in the virtual space. However, when the inclination of the course in the virtual space is about 20° to 40°, the inclination by the pitching of the base section 41 in FIG. 4 can be no larger than approximately 10° for example. Thus, due to such a large difference from the inclination of the course in the virtual world, the pitching of the base section 41 in FIG. 4 cannot sufficiently prevent the 3D sickness due to the display image being shaken.

In view of this, with the control method for the virtual camera VC in FIG. 18, the HMD displays an image as if the user's head is forcibly moved downward and upward in accordance with the shape of the course in the virtual space regardless of the intention and the feeling of the user, resulting in the 3D sickness.

In view of this, the present embodiment maintains the line-of-sight direction CVL of the virtual camera VC corresponding to the line-of-sight direction of the user to be constantly in parallel (substantially in parallel) with the horizontal plane HS, as long as the user does not move his or her head. Thus, when the course CS in the virtual space has an inclination (undulation), the line-of-sight direction CVL of the virtual camera VC does not change in accordance with the inclination of the course CS as in FIG. 18. Instead, the virtual camera VC is controlled so that the line-of-sight direction CVL is in parallel with the horizontal plane HS. This does not mean that the line-of-sight direction CVL of the virtual camera VC is constantly fixed to be in parallel with the horizontal plane HS. When the user moves the line-of-sight direction in a downward or an upward direction with his or her intention or based on his or her feeling, the line-of-sight direction CVL of the virtual camera VC is directed downward or upward accordingly. Thus, the line-of-sight direction can be prevented from changing against the user's intention and/or feeling, while being able to be changed based on the user's intention and/or response. All things considered, improvement of the virtual reality felt by the user and prevention of the 3D sickness due to the display image on the HMD being shaken can both be achieved.

More specifically, in the present embodiment, the tracking information for the point-of-view information about the user is acquired, and the position and/or the orientation of the virtual camera VC is changed based on the tracking information acquired. Here, the position and the orientation of the virtual camera VC respectively correspond to a point-of-view position CVP and the line-of-sight direction CVL.

Figure 19A:
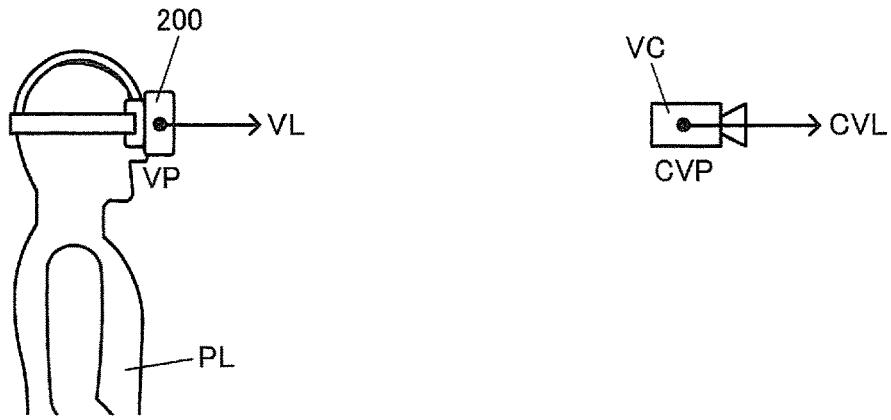
FIG. 19A to FIG. 19C are diagrams illustrating a method of changing the position and/or the orientation of the virtual camera based on tracking information.
Figure 19B:
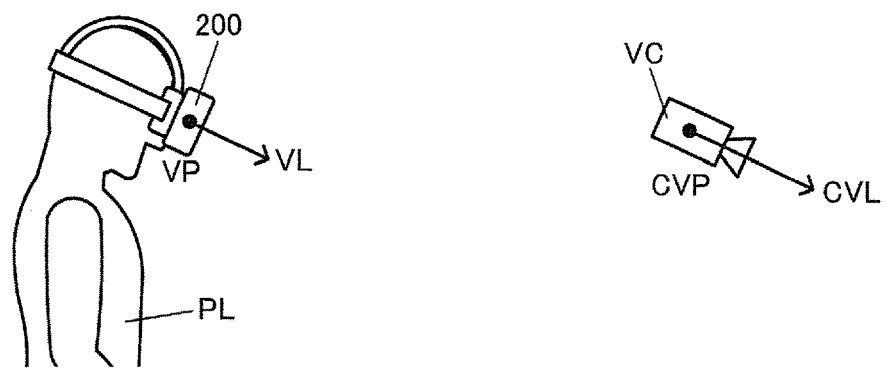
Figure 19C:
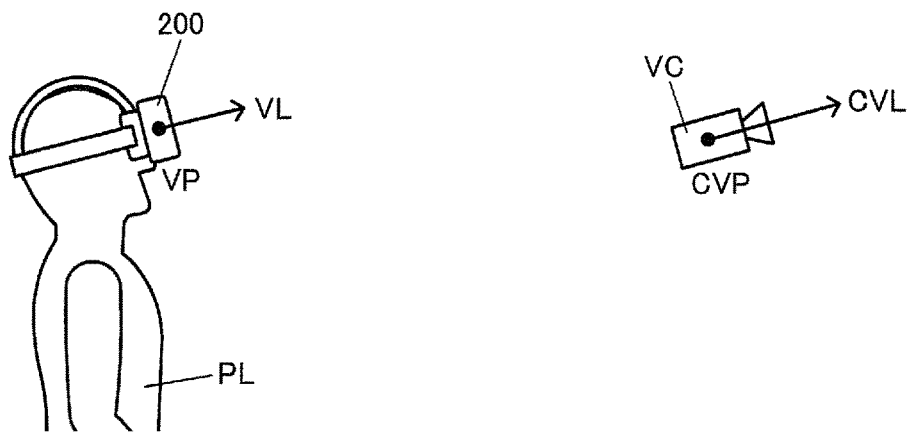

For example, as illustrated in FIG. 19A to FIG. 19C, when the user PL in the real world moves a line-of-sight direction VL (head) downward or upward, the tracking information (point-of-view tracking information) for the point-of-view information about the user PL is acquired through the tracking process for the HMD 200 for example. Then, the point-of-view position CVP and/or the line-of-sight direction CVL of the virtual camera VC is set based on the acquired tracking information (information identifying the point-of-view position and/or the line-of-sight direction of the user) to change the position and/or the orientation of the virtual camera VC as illustrated in FIG. 19A to FIG. 19C. For example, as illustrated in FIG. 19B, the line-of-sight direction CVL of the virtual camera VC is directed downward when the line-of-sight direction VL of the user PL is directed downward. For example, as illustrated in FIG. 19C, the line-of-sight direction CVL of the virtual camera VC is directed upward when the line-of-sight direction VL of the user PL is directed upward. With this configuration, when the user PL in the real world changes the point-of-view position VP and/or the line-of-sight direction VL, the point-of-view position CVP and/or the line-of-sight direction CVL of the virtual camera VC changes accordingly. Thus, the virtual camera VC behaves like the actual first person point-of-view of the user PL, whereby improved virtual reality can be provided.

More specifically, the user is instructed to take the reference pose (standing posture that serves as the reference) before the game starts. Then, the initial point-of-view position and/or the initial line-of-sight direction of the user is detected through the tracking process for the HMD 200 and is stored in a storage section (a storage section of the HMD and/or the simulation system). Then, when the game starts, the change information indicating a change from the stored initial point-of-view position and/or the initial line-of-sight direction is acquired as the tracking information. Thus, the change information about the point-of-view position and/or the line-of-sight direction of the user is acquired as the tracking information. For example, the change information about the point-of-view position is a change value of coordinates of the point-of-view position, and the change information about the line-of-sight direction is a change value of the rotational angle (a rotational angle about the rotation axis) representing the line-of-sight direction. For example, it is assumed that the coordinates of the initial point-of-view position is $(x0,y0,z0)$, and that the change value of the coordinates of the point-of-view position is $(\Delta x, \Delta y, \Delta z)$. Furthermore, it is assumed that the rotational angle representing the initial line-of-sight direction is $(\theta x0, \theta y0, \theta z0)$, and that the change value of the rotational angle representing the line-of-sight direction is $(\Delta \theta x, \Delta \theta y, \Delta \theta z)$. Under these conditions, the current point-of-view position can be represented by $(x,y,z)=(x0+\Delta x, y0+\Delta y, z0+\Delta z)$, and the current rotational angle of the line-of-sight direction can be represented by $(\theta x, \theta y, \theta z)=(\theta x0+\Delta \theta x, \theta y0+\Delta \theta y, \theta z0+\Delta \theta z)$.

Next, the point-of-view position and/or the line-of-sight direction of the virtual camera is set based on the tracking information to change the position and/or the orientation of the virtual camera. The point-of-view position and/or the line-of-sight direction of the virtual camera can be set by a process of adding $(\Delta x, \Delta y, \Delta z)$, $(\Delta \theta x, \Delta \theta y, \Delta \theta z)$ described above to the coordinates of the initial point-of-view position and the rotational angle representing the initial line-of-sight direction of the virtual camera.

With the method described above, the virtual camera is set to be at the point-of-view position of the character, regardless of the height (body size) of the user riding the movable casing 40 in FIG. 4. Thus, characters of different models need not to be prepared in accordance with the height of the user for example, whereby reduction of a data amount and the like can be achieved.

As described above, in the present embodiment, the position and/or the orientation of the virtual camera VC is changed based on the tracking information acquired through the tracking process. Thus, when the user in the real world changes the point-of-view position and/or the line-of-sight direction, the point-of-view position and/or the line-of-sight direction of the virtual camera VC in the virtual space changes accordingly, whereby the user can experience improved virtual reality.

On the other hand, in the present embodiment, the virtual camera VC is also set to disable (or limit) the orientation change corresponding to at least one of the pitching and rolling of the virtual camera VC in response to the change in the traveling direction DT of the character CH (moving body) as in FIG. 18.

Figure 20:
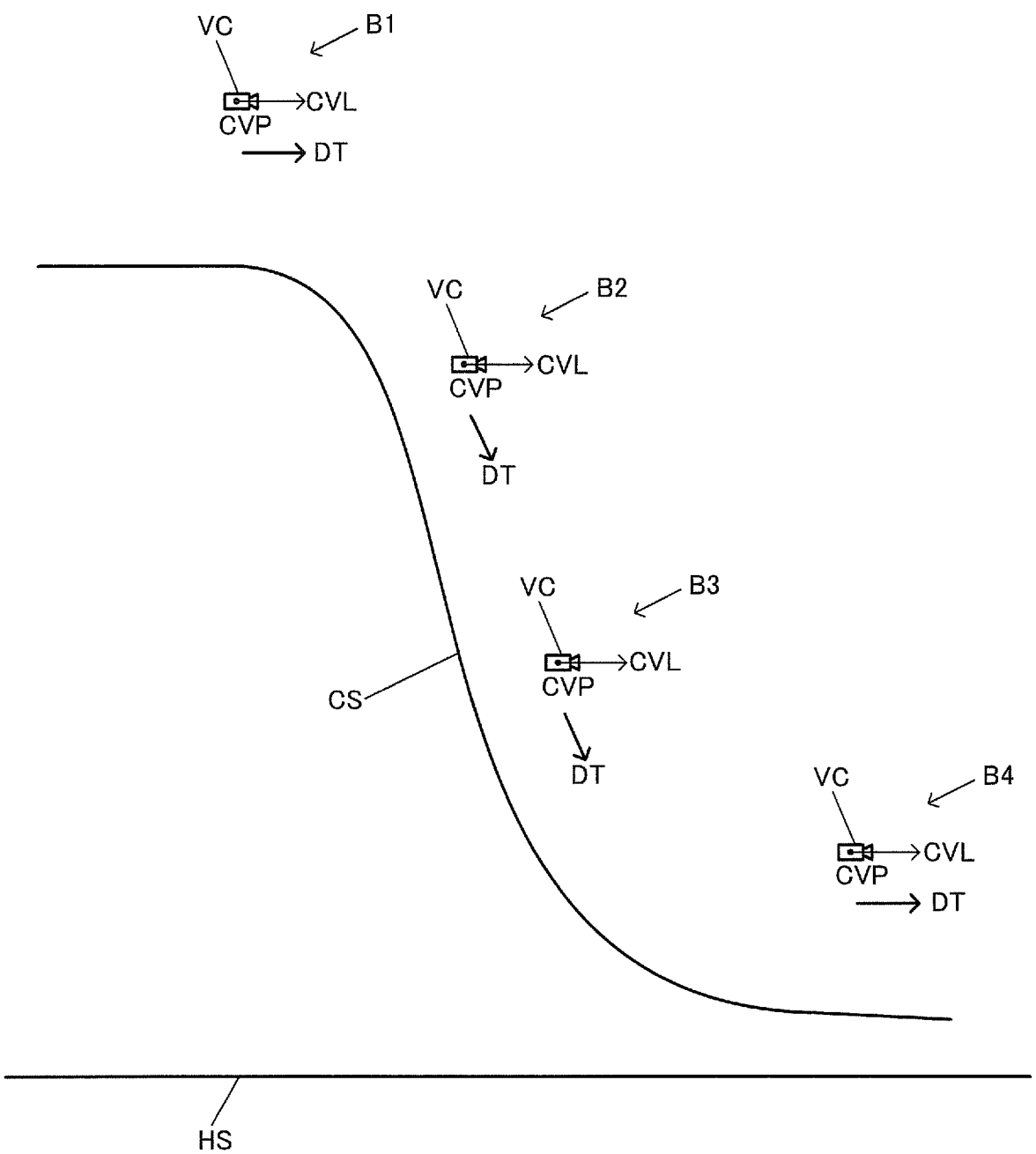
FIG. 20 is a diagram illustrating a method of disabling the orientation change of the virtual camera.

For example, in FIG. 20, the traveling direction DT of the character CH changes as illustrated in B1, B2, B3, and B4 as the character CH travels on the downhill course CS. Also in such a case in FIG. 20, the orientation change corresponding to the pitching of the virtual camera VC (rotational motion about the rotation axis corresponding to pitching) is not performed, and the line-of-sight direction CVL of the virtual camera VC is maintained to be in parallel with the horizontal plane HS for example. Specifically, in FIG. 18, the line-of-sight direction CVL of the virtual camera VC is changed in accordance with the status (such as inclination, undulation, or shape) of the course CS, and the orientation change corresponding to the pitching of the virtual camera VC is performed. On the other hand, in FIG. 20, the line-of-sight direction CVL of the virtual camera VC does not depend on the status of the course CS, and the orientation change corresponding to the pitching of the virtual camera VC is not performed. Still, the line-of-sight direction CVL of the virtual camera VC in FIG. 20 is not constantly fixed to be in parallel with the horizontal plane HS, and changes when the user directs the line-of-sight direction upward or downward as described with reference to FIG. 19A to FIG. 19C.

Figure 21:
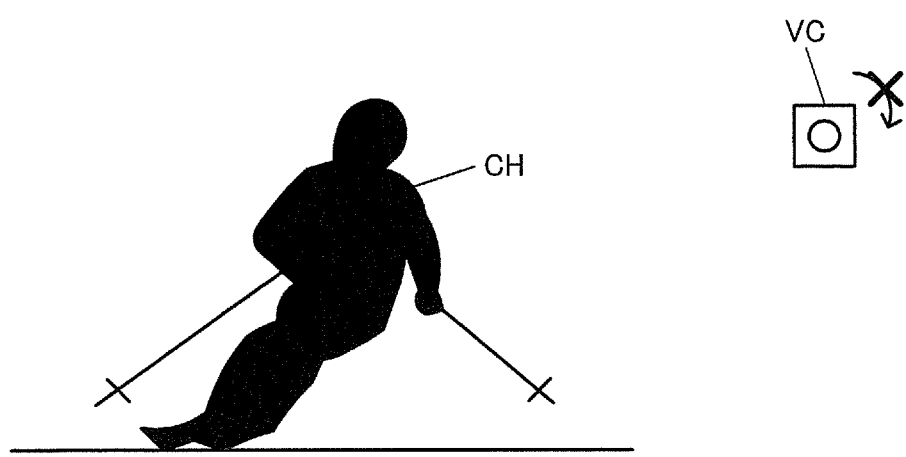
FIG. 21 is a diagram illustrating a method of disabling the orientation change of the virtual camera.

In the present embodiment, the orientation change corresponding to the rolling of the virtual camera VC is not performed as illustrated in FIG. 21, even when a situation where the rolling may be performed occurs in accordance with the change in the traveling direction of the character CH for turning right or left. Specifically, the virtual camera VC is set so as not to rotate about the rotation axis for the rolling. With this configuration, in the display image on the HMD in FIG. 5, no change in the horizontal direction occurs unless the user turns his or her head left or right, whereby the 3D sickness can be suppressed.

Note that orientation change corresponding to the yawing of the virtual camera VC is performed for example, when a change in the traveling direction of the character CH for turning right or left occurs. For example, the orientation change corresponding to yawing is performed so that when the character CH turns right, the line-of-sight direction CVL of the virtual camera VC is directed rightward, and when the character CH turns left, the line-of-sight direction CVL of the virtual camera VC is directed leftward. With this configuration, the user can see an image that is supposed to be shown in the traveling direction of the character CH as the virtual user through the virtual camera VC, whereby an appropriate image can be displayed as a display image on the HMD in FIG. 5.

For example, an axis along a long axis (optical axis) of the virtual camera VC is defined as a ZV axis, axis orthogonal to the ZV axis and in parallel with the vertical direction of the world coordinate system is defined as a YV axis, and an axis orthogonal to the ZV axis and the YV axis is defined as an XV axis. In such a case, for example, the pitching of the virtual camera VC is a rotational motion about the XV axis. For example, the rolling of the virtual camera VC is a rotational motion about the ZV axis. For example, the yawing is a rotational motion about the YV axis. The virtual camera VC is set so that in FIG. 20, the pitching of the virtual camera VC, which is the rotational motion about the XV axis, is not performed and in FIG. 21, the rolling of the virtual camera VC, which is the rotational motion about the ZV axis, is not performed. However, the yawing of the virtual camera VC, which is the rotational motion about the YV axis, is allowed.

With reference to FIG. 20 and FIG. 21, the cases where the orientation change of the virtual camera VC corresponding to the pitching and rolling is disabled are described in a case where the traveling direction changes. Note that the virtual camera VC may be controlled to limit (suppress) the orientation change. For example, α is assumed to represent a change in a pitch angle of the virtual camera VC in a case where the line-of-sight direction CVL of the virtual camera VC is changed to be in parallel with the traveling direction DT of the character CH as illustrated in FIG. 18. Under such a condition, in FIG. 20, a change in the pitch angle of the virtual camera VC is $\Delta\theta p=0$, and the orientation change corresponding to the pitching of the virtual camera VC may be limited so that $\Delta\theta p$ can be sufficiently reduced to be $\Delta\theta p<\alpha$. In the rolling for the cornering in FIG. 21, β is assumed to represent a change in a rolling angle that is an angle of a body axis (an axis along a longitudinal direction, vertical axis) of the character CH relative to the axis in the vertical direction. Under such a condition, in FIG. 21, a change in the roll angle of the virtual camera VC is $\Delta\theta r=0$, and the orientation change corresponding to the rolling of the virtual camera VC can be limited so that $\Delta\theta r$ is sufficiently reduced to be $\Delta\theta r<\beta$.

As described above, with the present embodiment, even in a situation where the pitching and/or the rolling may occur due to a change in the traveling direction DT of the character CH (moving body), the pitch angle and the roll angle of the virtual camera VC remains unchanged (or a change in the pitch angle and/or the roll angle is limited). Thus, the display image on the HMD can be prevented from being largely or massively shaken, whereby 3D sickness can be prevented. In such a case, when the user changes the point-of-view position VP and/or the line-of-sight direction VL by moving his or her head or making the other like action, the orientation of the virtual camera VC changes accordingly as illustrated in FIG. 19A to FIG. 19C. Thus, the user can feel virtual reality as if he or she is an actual skier gliding down the course. Thus, the present embodiment can provide a simulation system that can achieve both prevention of problem such as 3D sickness and improvement of virtual reality.

For example, in a method according to Comparative Example of the present embodiment, the line-of-sight direction of the virtual camera may be set to be constantly in parallel with the horizontal plane. This method according to Comparative Example is suitable for a system for generating a pseudo three-dimensional image as viewed from a normal third person point-of-view. However, this method according to Comparative Example makes the line-of-sight direction of the virtual camera constantly fixed to be in parallel with the horizontal direction regardless of the intention and/or reaction of the user, and thus is unsuitable for systems using the HMD.

On the other hand, with the method according to the present embodiment, when the point-of-view position and/or the line-of-sight direction of the user in the real world changes due to a movement of his or her head as the user's intentional or unintentional reaction, the point-of-view position and/or the line-of-sight direction of the virtual camera in the virtual world changes accordingly (FIG. 19A to FIG. 19C). Thus, a change in the point-of-view of the virtual camera reflecting a change in the point-of-view based on the intention and response of the user can be implemented, so that virtual camera control optimum for the system using HMDs can be implemented, whereby the improvement of the virtual reality experienced by the user and the like can be achieved. In the present embodiment, while such a change in the point-of-view based on an intention and reaction of the user is reflected, the influence of a change in the traveling direction of the moving body is not reflected on the orientation change corresponding to the pitching and/or the rolling of the virtual camera. Thus, a simulation system that can improve the virtual reality while preventing the 3D sickness and the like can be provided.

Figure 22:
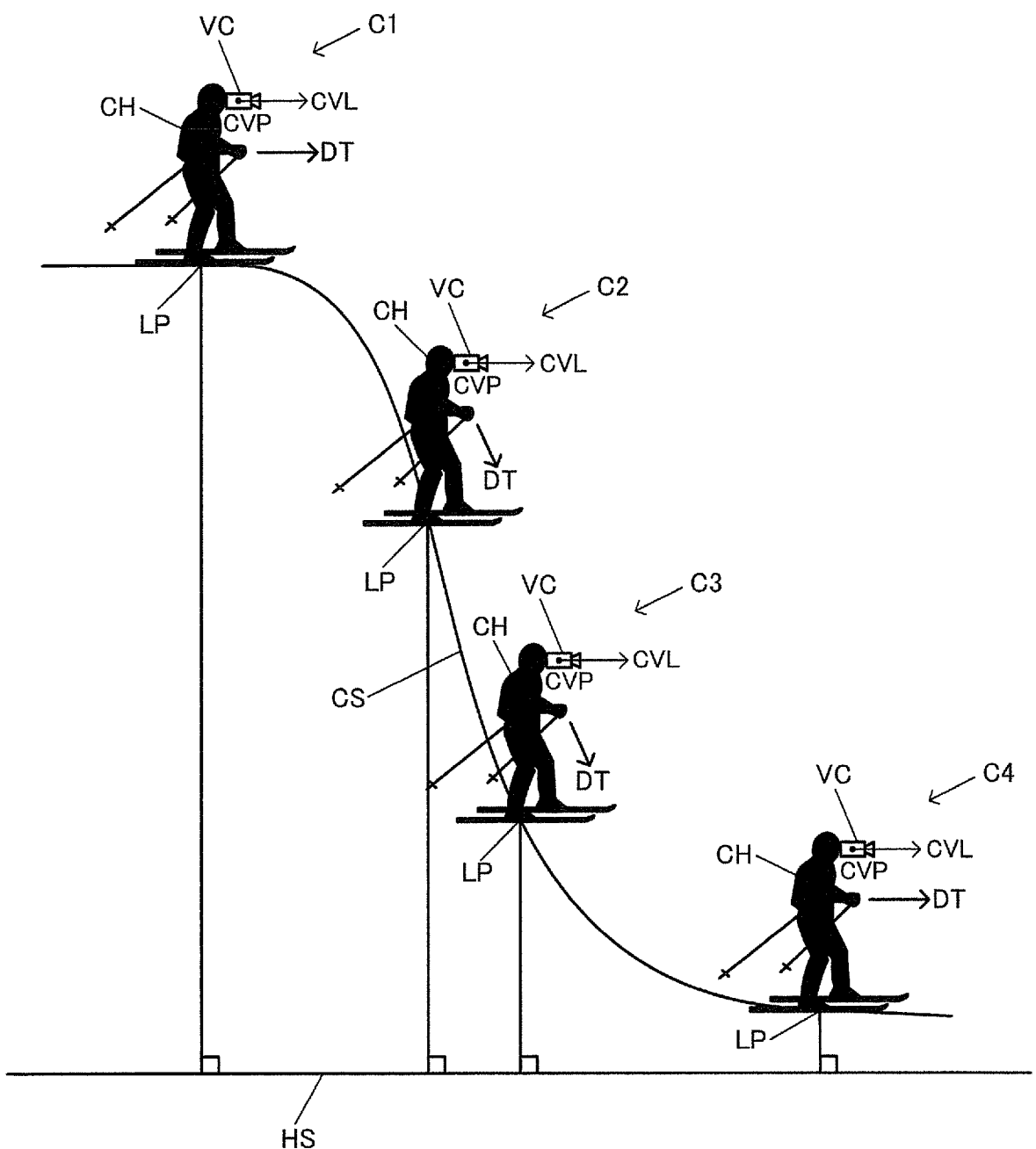
FIG. 22 is a diagram illustrating a first implementation method for the process of disabling the orientation change of the virtual camera.

FIG. 22 is a diagram illustrating a first implantation method for the process of disabling (process of limiting) the orientation change corresponding to the pitching and/or rolling of the virtual camera.

In FIG. 22, as illustrated in C1 to C4, a process of moving the character CH is performed while disabling (or limiting) the orientation change of the character CH corresponding to at least one of the pitching and rolling in a case where the traveling direction DT of the character CH (moving body) changes. The virtual camera VC is set at the point-of-view position of the character CH for which the orientation change is disabled (or limited). In other worlds, when the character CH (virtual user) corresponding to the user moves in the virtual space, his or her line-of-sight direction is calculated by being converted into a point-of-view coordinate system of a basic model (basic posture), in which the reference coordinates (foot position LP) is common to that of the character CH and a body axis (Y axis) is orthogonal to the horizontal plane HS (reference plane) of the world coordinate system, whereby the 3D sickness is prevented.

For example, in FIG. 18, the orientation change of the character CH corresponding to the pitching occurs in accordance with the status (inclination) of the course CS. For example, on the downhill course CS, the orientation change corresponding to the forward pitching of the character CH occurs. Thus, the orientation change resulting in a pitch angle that is a depression angle relative to the horizontal direction occurs. On the uphill course CS, an orientation change corresponding to backward pitching of the character CH occurs. Thus, the orientation change resulting in a pitch angle that is an elevation angle relative to the horizontal direction occurs.

On the other hand, in FIG. 22, as illustrated in C1 to C4, the orientation change of the character CH corresponding to the pitching does not occur even when the traveling direction DT of the character CH changes. For example, the posture of the character CH is set (fixed) with a right angle (approximately right angle) formed between the body axis (line connecting the head and the feet) of the character CH and the horizontal plane HS of the world coordinate system. For example, the character CH taking a basic posture (upright posture) is arranged at the foot position LP (reference coordinates) of the character CH. Even when the traveling direction DT of the character CH changes, the character CH travels on the course CS while still taking the basic posture (upright posture). For example, when height information about the course at each point is set as the course information, the character CH is moved only with reference to this height information set as the course information. Only the height of the foot position LP as the reference position is changed without changing the posture of the character CH for example. The course CS illustrated in FIG. 22 is a downhill course, and thus the traveling by the character CH on the course CS involves a change in the height of the character CH (foot position LP) only, and involves no orientation change of the character CH.

Similarly, even in a situation where the orientation change corresponding to rolling may occur due to the right or left cornering as described with reference to FIG. 21, the orientation change corresponding to rolling of the character CH does not occur. Thus, even when the traveling direction DT changes due to the cornering, the character CH travels on the course CS while maintaining the basic posture (standing posture) as illustrated in FIG. 22, with no orientation change corresponding to rolling as illustrated in FIG. 21.

The point-of-view position CVP of the virtual camera VC is set to be at the point-of-view (point-of-view coordinate system) position of the character CH taking the basic posture described above. The line-of-sight direction CVL of the virtual camera VC is in parallel with the horizontal plane HS. For example, the orientation of the character CH is maintained to be that with the basic posture, and thus the point-of-view position of the character CH relative to the foot position LP is fixed, and the point-of-view position CVP of the virtual camera VC is set to be at this fixed position. The basic posture of the character CH is the upright posture, and the line-of-sight direction CVL of the virtual camera VC is orthogonal (substantially orthogonal) to the body axis of the character CH.

Actually, the character CH is a skier and thus its basic posture is slightly tilted forward. Thus, the angle between the body axis of the character CH and the horizontal plane HS is slightly smaller than 90°, and the angle between the body axis of the character CH and the line-of-sight direction CVL of the virtual camera VC is slightly larger than 90°.

As described above, in FIG. 22, even when the traveling direction DT changes, the character CH travels on the course CS while maintaining the basic posture (upright posture, forward tilted posture), with no orientation change corresponding to pitching and/or rolling. With the virtual camera VC set to be at the point-of-view position of the character CH maintaining such a basic posture, the orientation control for the virtual camera VC as illustrated in FIG. 20 can be implemented. Specifically, the orientation control can be performed so that the pitching and/or the rolling of the virtual camera VC does not occur in response to a change in the traveling direction DT.

Figure 23:
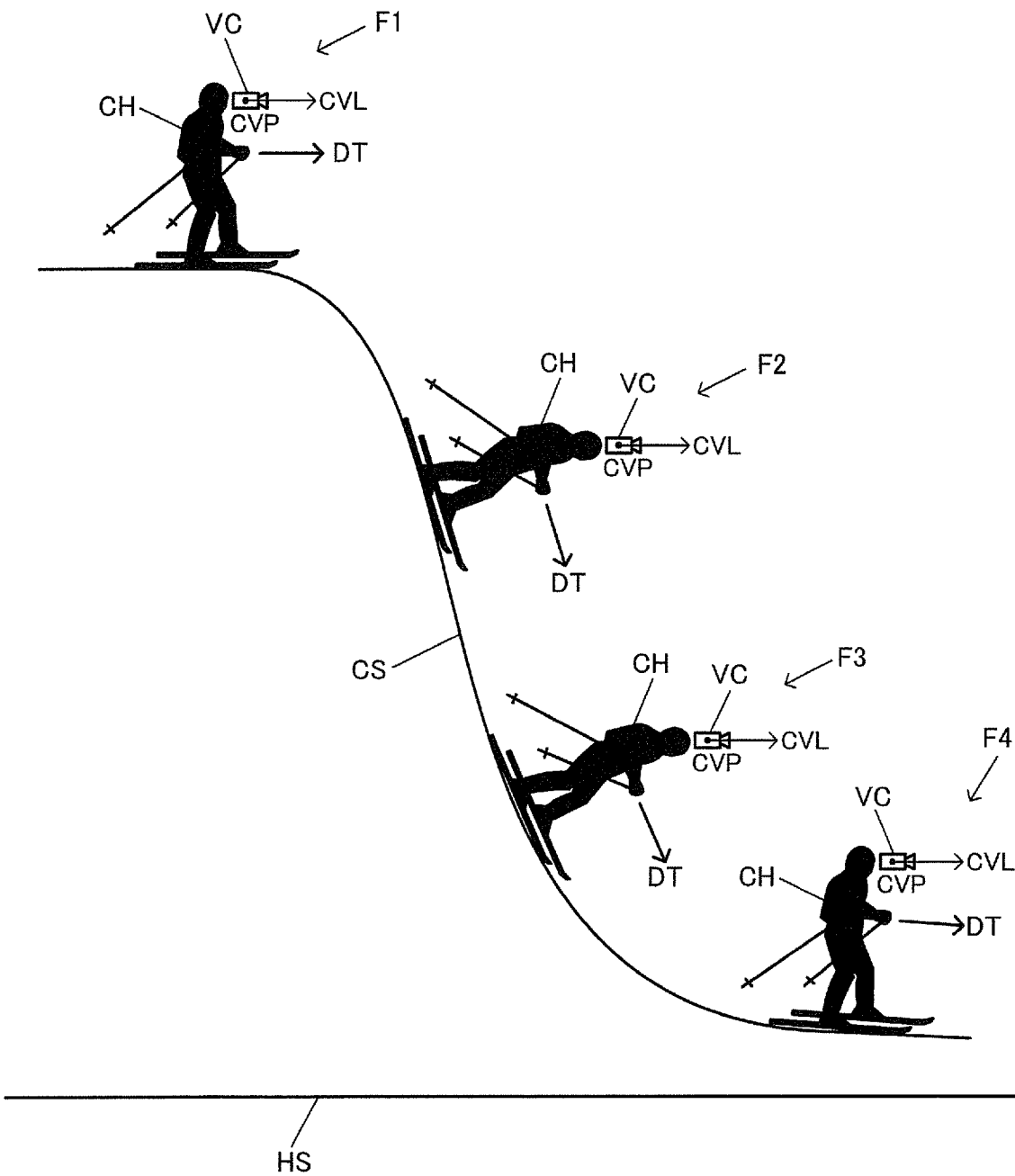
FIG. 23 is a diagram illustrating a second implementation method for the process of disabling the orientation change of the virtual camera.

FIG. 23 is a diagram illustrating a second implantation method for the process of disabling (process of limiting) the orientation change corresponding to the pitching and/or rolling of the virtual camera.

In F1 to F4 in FIG. 23, a process of moving the character CH (moving body) so that the orientation of the character CH changes is performed in accordance with a change in the traveling direction DT of the character CH. For example, on the downhill course CS, an orientation change corresponding to forward pitching of the character CH occurs. On the uphill course CS, an orientation change corresponding to backward pitching of the character CH occurs. Orientation change corresponding to rolling occurs when the moving object turns right or left.

In F1 to F4 in FIG. 23, the virtual camera VC is set to disable (limit) the orientation change of the virtual camera VC corresponding to the pitching and/or rolling in a case where the orientation of the character CH changes due to such a change in the traveling direction DT.

For example, the course CS in F2 and F3 in FIG. 23 is a downhill, and thus the traveling direction DT is in a downward direction. Thus, the orientation change corresponding to the forward pitching is performed on the character CH. However, the line-of-sight direction CVL of the virtual camera VC is in the horizontal direction and thus is different from the traveling direction DT.

Thus, even when the traveling direction of the character CH changes in accordance with the status of the course CS and the like, the line-of-sight direction CVL of the virtual camera VC stays to be in a predetermined direction (horizontal direction) unless the user moves his or her head or makes the other like actions. Thus, the display image on the HMD can be prevented from being largely or massively shaken, whereby the 3D sickness can be prevented. The second implementation method in FIG. 23 is different from the first implementation method in FIG. 22 in that the orientation of the character CH changes in accordance with the traveling direction DT. For example, the orientation changes to be directed downward on the downhill course CS, and changes to be directed upward on the uphill course CS. At the time of cornering, the orientation changes with rolling with which the body axis is inclined rightward or leftward as illustrated in FIG. 21. Thus, an image the opponent user, audiences, and the like do not feel unnatural can be displayed as the competition image, observation image or demo image, for example. Thus, the prevention of 3D sickness due to the shaking of the display image on the HMD and generation of an appropriate competition image, observation image, or demo image can both be achieved. The competition image is an image used for competition. For example, the competition image is an image with which an opponent user as a competitor sees the moving body of the user, and is an image displayed on an HMD (display section) of the opponent user, for example. The observation image (watching image) is an image used for observation. For example, the observation image is an image for observing (watching) a game involving a movement of the moving body of the user. For example, the observation image is an image displayed on an observation monitor so that audiences can watch the game. The demo image is an image used for demos. For example, the demo image is an image displayed for demonstration before and/or after the game or at the other like timing.

Figure 24A:
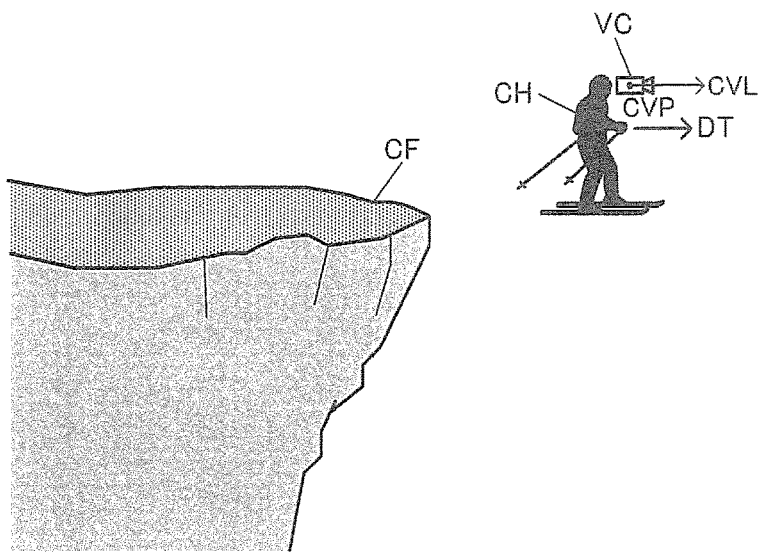
FIG. 24A to FIG. 24C are diagrams illustrating how the virtual camera is set at the time of falling off a cliff.
Figure 24B:
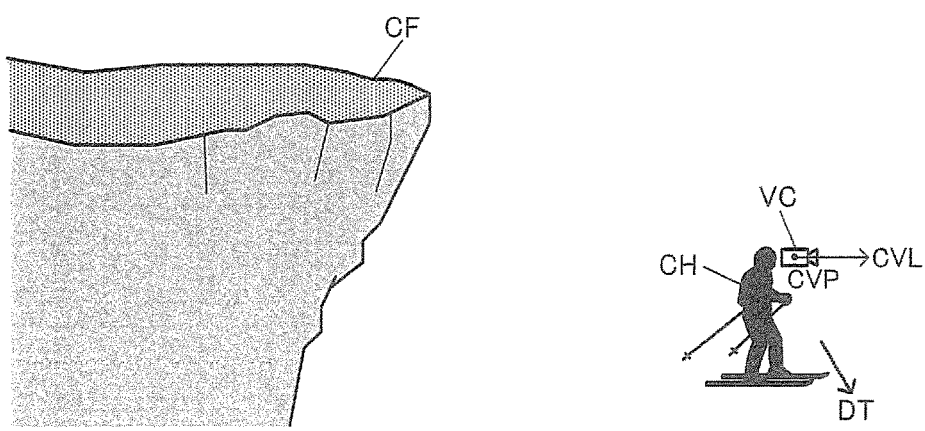
Figure 24C:
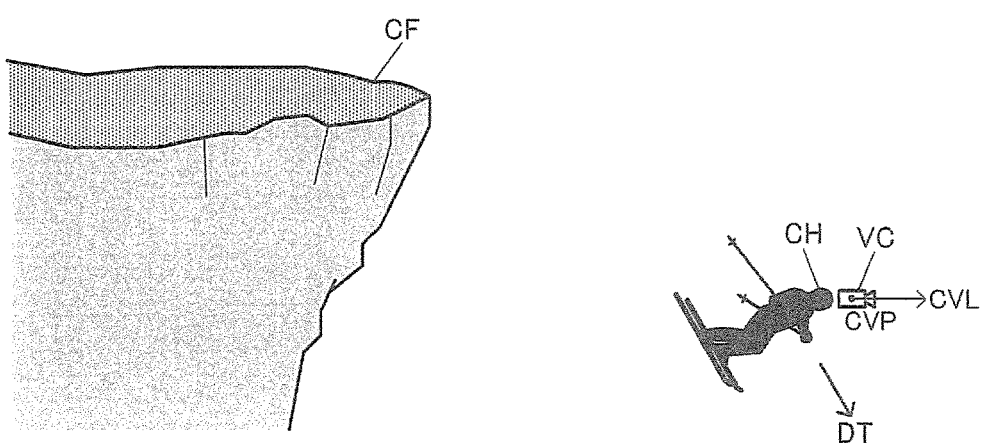

FIG. 24A to FIG. 24C are diagrams illustrating a change in the orientation of the virtual camera VC at the time of the event of falling off the cliff CF. As illustrated in FIG. 24A, when the character CH jumps from the cliff CF and thus falls off as illustrated in FIG. 24B and FIG. 24C, the traveling direction DT of the character CH changes from a horizontal direction to a downward direction. In such a case, the method illustrated in FIG. 20 is performed in the present embodiment, so that the line-of-sight direction CVL of the virtual camera VC is maintained to be in the horizontal direction instead of being directed in the downward direction as illustrated in FIG. 24B and FIG. 24C. Thus, the orientation change of the virtual camera VC corresponding to pitching is disabled.

FIG. 24B illustrates an example where the first implementation method illustrated in FIG. 22 is used, and FIG. 24C illustrates an example where the second implementation method illustrated in FIG. 23 is used. In FIG. 24B, the first implementation method is employed so that the orientation change of the character CH corresponding to pitching is disabled. In FIG. 24C, the second implementation method is employed so that the orientation change of the character CH corresponding to pitching is implemented, but the orientation change of virtual camera VC corresponding to pitching is disabled. As illustrated in FIG. 24B and FIG. 24C, when the user in the real world looks down as illustrated in FIG. 19B, the line-of-sight direction CVL of the virtual camera VC is also directed downward, so that the user can see a scene under the cliff.

Figure 25A:
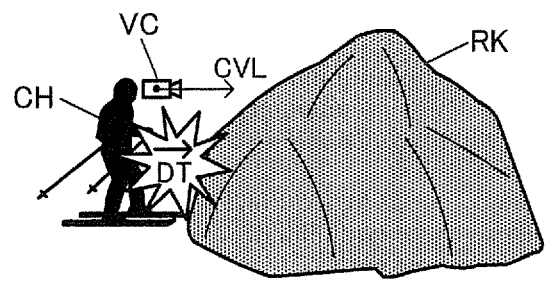
FIG. 25A to FIG. 25C are diagrams illustrating how the virtual camera is set at the time of collision with a rock.
Figure 25B:
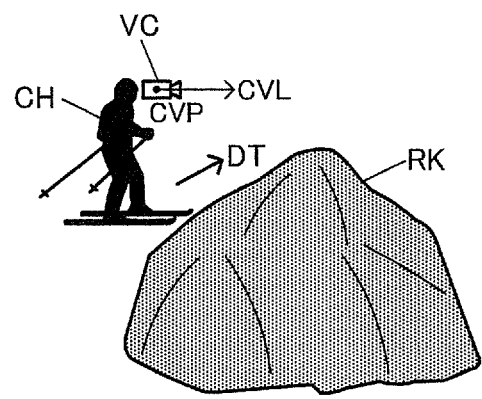
Figure 25C:
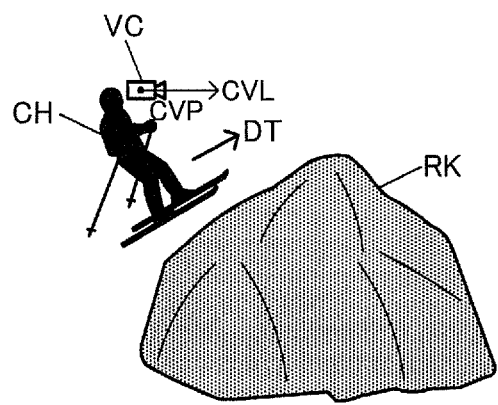

FIG. 25A to FIG. 25C are diagrams illustrating a change in orientation of the virtual camera VC due to an event of colliding with the rock RK. When the character CH collides with the rock RK as illustrated in FIG. 25A, the traveling direction DT of the character CH changes to an upward direction for example in FIG. 25B and FIG. 25C. In such a case, in the present embodiment, the line-of-sight direction CVL of the virtual camera VC is maintained to be in the horizontal direction instead of being directed in the upward direction, as illustrated in FIG. 25B and FIG. 25C, when the method illustrated in FIG. 20 is used. Thus, the orientation change of the virtual camera VC corresponding to pitching is disabled.

FIG. 25B illustrates an example where the first implementation method illustrated in FIG. 22 is used, and FIG. 25C illustrates an example where the second implementation method illustrated in FIG. 23 is used In FIG. 25B, the first implementation method is employed so that the orientation change of the character CH corresponding to pitching is disabled. In FIG. 25C, the second implementation method is employed so that the orientation change of the character CH corresponding to pitching is implemented, but the orientation change of virtual camera VC corresponding to pitching is disabled. In FIG. 25B and FIG. 25C, when the user in the real world looks up as illustrated in FIG. 19C, the line-of-sight direction CVL of the virtual camera VC is also directed upward.

Thus, the orientation change of the virtual camera VC corresponding to pitching and the like is disabled in FIG. 24A to FIG. 25C, whereby the user can be prevented from feeling 3D sickness and the like. However, in FIG. 24A to FIG. 24C for example, the line-of-sight direction CVL of the virtual camera VC is maintained to be horizontal but the point-of-view position CVP of the virtual camera VC moves downward, and thus the display image on the HMD in FIG. 5 largely changes accordingly. Furthermore, in FIG. 25A to FIG. 25C, the point-of-view position CVP of the virtual camera VC moves upward, and thus the display image on the HMD in FIG. 5 largely changes accordingly. Thus, the method of disabling the orientation change of the virtual camera corresponding to pitching and the like cannot completely prevent the user from feeling 3D sickness and the like.

In view of this, in the present embodiment, the fadeout process or the like is performed on the display image, when the collision event or the falling off event occurs as described with reference to FIG. 10A to FIG. 14B. Thus, in FIG. 24A to FIG. 25C, when the display image on the HMD largely changes due to the downward or upward movement of the point-of-view position CVP of the virtual camera VC, the display image is faded out in a short period of time or the other like measure is taken so that the user can be prevented from feeling 3D sickness or the like.

4.3 Control on Movable Casing and Output Sound, User Setting, Play History

Figure 26:
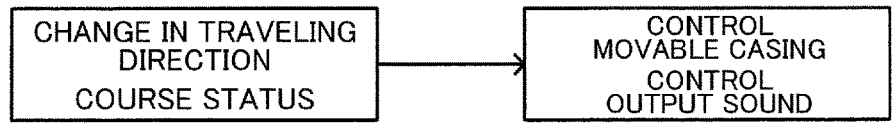
FIG. 26 is a diagram illustrating a method of controlling the movable casing and output sound.

In the present embodiment, as illustrated in FIG. 26, the movable casing 40 described with reference to FIG. 4, FIG. 6, and the like may change the play position of the user in accordance with a change in the traveling direction of the moving body (such as a character) or the status (condition) of the course on which the moving body moves. Alternatively, sound corresponding to a change in the traveling direction of the moving body or output sound corresponding to the status of the course on which the moving body moves may be generated.

For example, when the traveling direction of the moving body (such as a character) in the virtual space is directed downward on a downhill course, the movable casing 40 is controlled so that the orientation of the user in the real space is pitched forward. In an example illustrated in FIG. 4, the rear air spring sections 50 and 52 are extended, whereas the front air spring sections 51 and 53 are contracted. Furthermore, output sound (for example, wind sound) is output to make the user feel that he or she is moving down the downhill course for example. When the traveling direction of the moving body in the virtual space is directed upward on an uphill course, the movable casing 40 is controlled to implement backward pitching for the orientation of the user in the real space. In an example illustrated in FIG. 4, the rear air spring sections 50 and 52 are contracted, whereas the front air spring sections 51 and 53 are extended. For example, output sound that makes the user feel that he or she is climbing the uphill course is output.

If the course is a bumpy road with bumps, the movable casing 40 is controlled so that the play position of the user is vertically shaken. In the example illustrated in FIG. 4, the air spring sections 50 to 52 are vertically extended and contracted with small strokes. Furthermore, output sound indicating the bumpy road is output.

With the movable casing 40 and the output sound thus controlled, a change in the traveling direction of the moving body in the virtual space and/or the status of the course can be felt by the user using the movable casing 40 and/or the output sound. For example, a change in the traveling direction, a change in acceleration due to course status, and/or the like can be felt by a change in the play position by using the movable casing 40 or can be aurally recognized by a change in the output sound. Thus, the feeling and hearing status of the user in the real world somewhat matches the status of the moving body and the course in the virtual world, so that a risk of the user feeling 3D sickness can be reduced. For example, a massive change in the traveling direction of the moving body and/or the course status in the virtual space with no change in the play position achieved by using the movable casing 40 and/or in the output sound results in mismatch between the feeling and hearing status of the user and the status of the virtual space. Such a situation, which may result in 3D sickness, can be prevented by the method according to the present embodiment illustrated in FIG. 26.

In the present embodiment, the process start timing and the process level of the fadeout process and the effect process (the display process of changing to an image different from the image as viewed from the virtual camera) may be changed in accordance with the setting information from the user or the play history information about the user.

Figure 27:
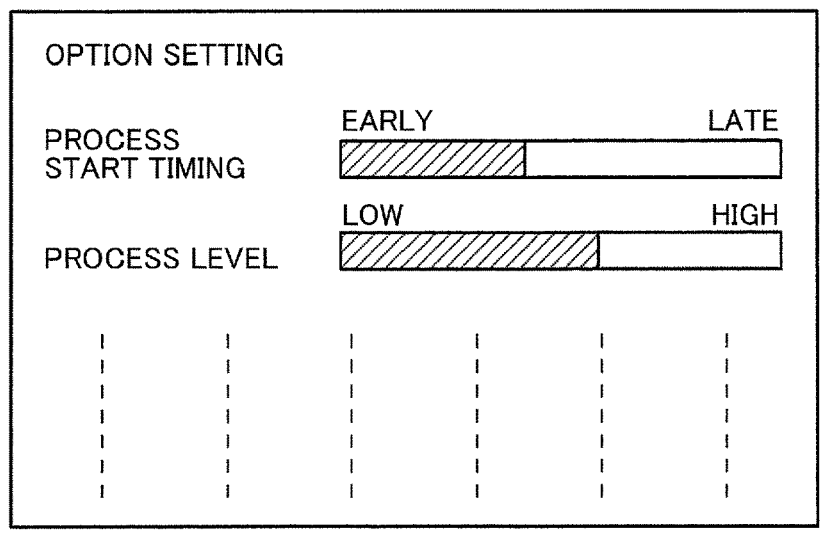
FIG. 27 is a diagram illustrating how the process start timing and the process level are set based on setting information from the user.

For example, FIG. 27 illustrates an example of an option setting screen used by the user for setting various options for a game. On this option setting screen, the user can set the process start timing and the process level of the fadeout process and the effect process. For example, the user who is likely to feel 3D sickness sets the process start timing to be early or the process level to be high. Thus, the fadeout process and the effect process start in a short period of time or are performed with a high process level, so that such a user can be effectively prevented from feeling 3D sickness. On the other hand, a user who is less likely to feel 3D sickness can set the process start timing to be late and the process level to be low, to enjoy the game with a more realistic setting.

Figure 28:
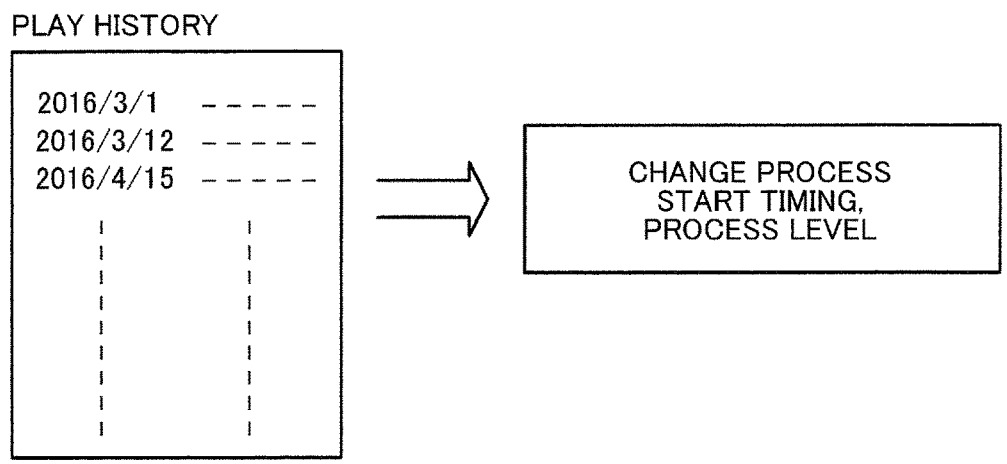
FIG. 28 is a diagram illustrating how the process start timing and the process level are set based on a play history.

In FIG. 28, the process start timing and the process level of the fadeout process and the effect process are set based on the information about the play history of the user. For example, for a user who is determined to be likely to cause an event such as collision, falling off, or falling down based on the play history information about the user, the process start timing is set to be early or the process level is set to be high. Thus, the process start timing is set to be early or the process level is set to be high for a user who is determined not to be familiar with the gameplay or is determined to be an elementary level player, so that he or she can be effectively prevented from feeling 3D sickness. On the other hand, the process start timing is set to be late or the process level is set to be low for a user who is determined to be familiar with the gameplay or is determined to be a skilled player, because he or she is determined to be less likely to feel 3D sickness. For example, the number of times the user has made collision, falling off, or falling down, or the past setting (such as option setting) is identified based on the play history information. Then, based on the information such as the number of times the user has made collision, falling off, or falling down, or the past setting, the process of changing to an image different from the image as viewed from the virtual camera is performed. For example, setting parameters such as the process start timing and/or the process level of the fadeout process and/or the effect process is determined based on the information. The play history information is stored in the portable information storage medium 195 (such as an IC card) in FIG. 1 for example, and the process start timing and/or the process level is set based on the play history information in the portable information storage medium 195. Alternatively, the play history information about the user may be downloaded from an external server.

4.4 Process Example

Figure 29:
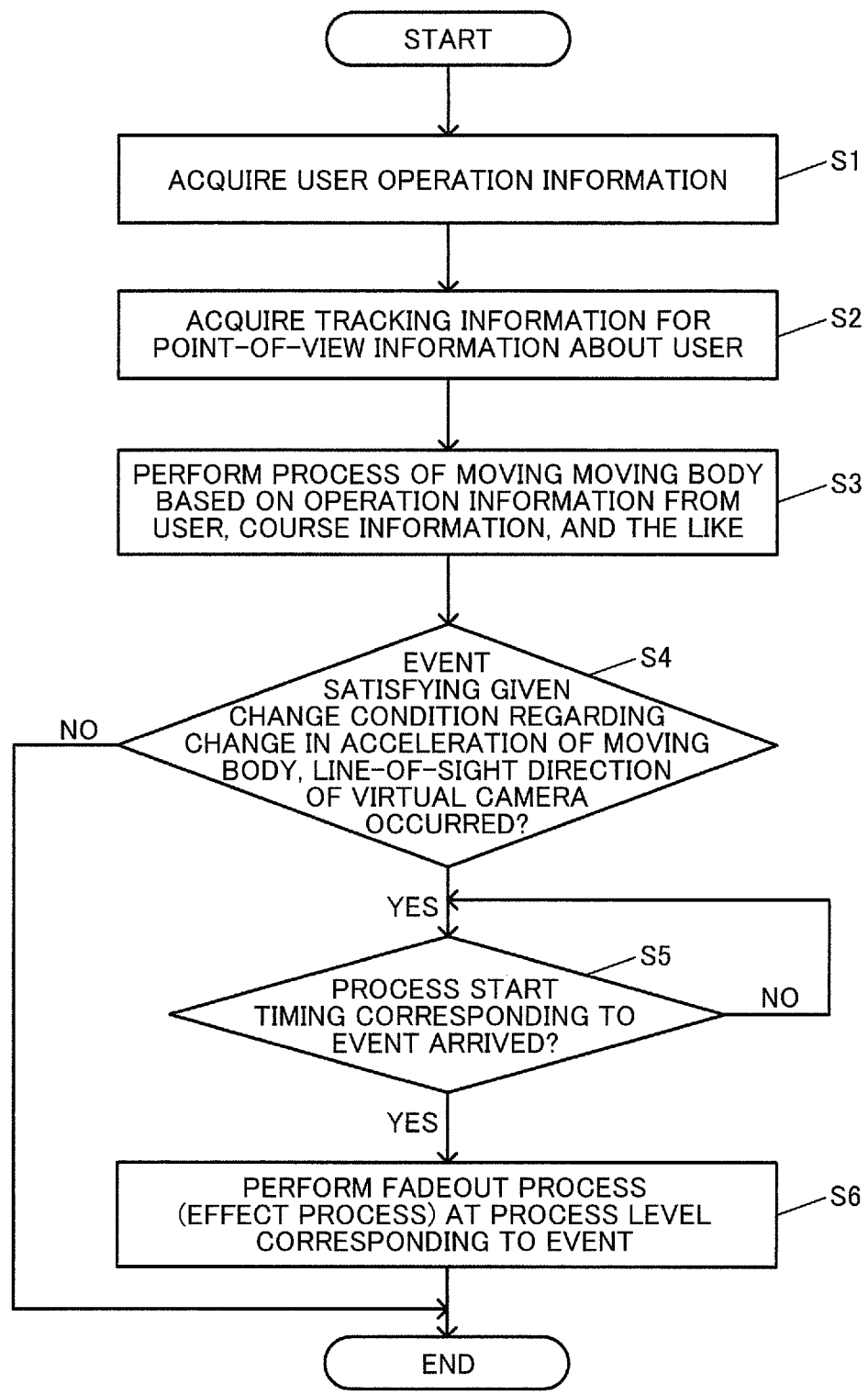
FIG. 29 is a flowchart illustrating a detailed process example according to the present embodiment.

Next, an example of the process according to the present embodiment is described with reference to a flowchart in FIG. 29.

First of all, operation information about the user is acquired (step S1). For example, the operation information about the user input through the operation section 160 in FIG. 1 is acquired. Then, tracking information for the point-of-view information about the user is acquired (step S2). For example, the tracking information obtained through the tracking process described with reference to FIG. 2A to FIG. 3B is acquired. Then, a process of moving the moving body based on the operation information about the user, the course information, and the like is performed (step S3). For example, a process of moving the moving body such as a character on a course defined by the course information is performed based on the operation information about the user.

Next, whether an event satisfying the given change condition regarding a change in the acceleration of the moving body or a change in the line-of-sight direction of the virtual camera has occurred is determined (step S4). For example, whether the collision event, the falling off event, or the falling down event described above has occurred is determined. When the event occurs, whether or not the process start timing corresponding to the event has arrived is determined (step S5). The process start timing can be acquired by using the table data as described above with reference to FIG. 17A for example. When the process start timing has arrived, the fadeout process (effect process) is performed at the process level corresponding to the event (step S6). The process level can be acquired by using the table data as described above with reference to FIG. 17B for example.

Although the present embodiment has been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each the terms (such as a character or an air spring section) that are at least once written together with a term (such as a moving body or an extension/contraction section) of a wider sense or an alternative term in the specification or the figures can be replaced with the alternative term at any part of the specification or the figures. A process of moving a moving body, a process of controlling a virtual camera (setting process), a process of determining whether a change condition is satisfied or an event has occurred, a process of displaying a display image on the HMD, a fadeout process, an effect process, and the like are not limited to those described in the present embodiment, and methods, processes, and configurations equivalent to these are also included in the scope of the present disclosure. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising a processor including hardware,
   the processor being configured to perform:
   a moving body process of performing a process of moving a moving body corresponding to a user wearing a head mounted display in a virtual space;
   a virtual camera control process of controlling a virtual camera moving in accordance with a movement of the moving body; and
   a display process of generating an image as viewed from the virtual camera in the virtual space as a display image on the head mounted display,
   in the display process,
   the processor performs
   a display process of changing, when a change in acceleration of the moving body or a change in a line-of-sight direction of the virtual camera is determined to have satisfied a given change condition, the display image on the head mounted display to an image different from the image as viewed from the virtual camera.

2. The simulation system as defined in claim 1, wherein
   in the display process,
   the processor performs
   a display process of entirely changing the display image on the head mounted display when the given change condition is satisfied.

3. The simulation system as defined in claim 2, wherein
   in the display process,
   the processor performs
   a process of fading out the display image, as the display process of entirely changing the display image.

4. The simulation system as defined in claim 1, wherein
   in the display process,
   the processor performs
   a display process of performing a given effect process on the image as viewed from the virtual camera when the given change condition is satisfied.

5. The simulation system as defined in claim 1, wherein
   in the display process,
   the processor performs
   a display process of changing, when the given change condition is determined to have been satisfied with an acceleration change event that changes a traveling direction of the moving body to a direction different from the traveling direction occurring, the display image on the head mounted display to the image different from the image as viewed from the virtual camera.

6. The simulation system as defined in claim 5, wherein the acceleration change event is at least one of a collision event of the moving body and a falling off event of the moving body.

7. The simulation system as defined in claim 1, wherein in the display process,
the processor performs
setting at least one of a process start timing and a process level of the display process of changing to the image different from the image as viewed from the virtual camera to be different between a case where a first event satisfying the given change condition occurs and a case where a second event satisfying the given change condition occurs.

8. The simulation system as defined in claim 1, wherein in the virtual camera control,
the processor performs
controlling the virtual camera set as a first person point-of-view of the user.

9. The simulation system as defined in claim 1, wherein the processor performs
an input process of acquiring tracking information for point-of-view information about the user wearing the head mounted display, and
in the virtual camera control process,
the processor performs
setting the virtual camera so that a position and/or an orientation of the virtual camera is changed based on the tracking information, but orientation change of the virtual camera corresponding to at least one of pitching and rolling is disabled or limited in a case where a traveling direction of the moving body changes.

10. The simulation system as defined in claim 1 further comprising
a movable casing that changes a play position of the user in accordance with a change in a status of a course on which the moving body moves or a change in a traveling direction of the moving body.

11. The simulation system as defined in claim 1, wherein the processor performs
a sound process of generating a sound corresponding to a status of a course on which the moving body moves or an output sound corresponding to a change in a traveling direction of the moving body.

12. The simulation system as defined in claim 1, wherein in the display process,
the processor performs
changing at least one of a process start timing and a process level of the display process of changing to the image different from the image as viewed from the virtual camera based on setting information from the user or play history information about the user.

13. A processing method comprising:
performing a moving body process of performing a process of moving a moving body corresponding to a user wearing a head mounted display in a virtual space;
performing a virtual camera control process of controlling a virtual camera moving in accordance with a movement of the moving body; and
performing a display process of generating an image as viewed from the virtual camera in the virtual space as a display image of the head mounted display,
in the display process,
performing changing, when a change in acceleration of the moving body or a change in a line-of-sight direction of the virtual camera is determined to have satisfied a given change condition, the display image on the head mounted display to an image different from the image as viewed from the virtual camera.

14. A computer-readable information storage medium storing a program for causing a computer to perform the processing method as defined in claim 13.

\* \* \* \* \*